(12) United States Patent  (10) Patent No.: US 8,959,060 B2
Carmichael                 (45) Date of Patent: Feb. 17, 2015

(54) GLOBAL INDEXING WITHIN AN ENTERPRISE OBJECT STORE FILE SYSTEM

(71) Applicant: Symantec Corporation, Mountain View, CA (US)

(72) Inventor: John Albert Carmichael, Singapore Post Centre (SG)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/068,199

(22) Filed: Oct. 31, 2013

(65) Prior Publication Data

US 2014/0059005 A1    Feb. 27, 2014

Related U.S. Application Data

(62) Division of application No. 13/101,964, filed on May 5, 2011, now Pat. No. 8,775,486.

(60) Provisional application No. 61/471,642, filed on Apr. 4, 2011.

(51) Int. Cl.
    *G06F 17/30*     (2006.01)
(52) U.S. Cl.
    CPC .... *G06F 17/30174* (2013.01); *G06F 17/30094* (2013.01)
    USPC .......................................... 707/683; 707/741
(58) Field of Classification Search
    None
    See application file for complete search history.

(56) References Cited

U.S. PATENT DOCUMENTS

| 6,308,177 | B1 | 10/2001 | Israni et al. |
|---|---|---|---|
| 2003/0090531 | A1* | 5/2003 | Wong et al. ........................ 347/1 |
| 2004/0096110 | A1* | 5/2004 | Yogeshwar et al. ........... 382/239 |
| 2005/0120242 | A1* | 6/2005 | Mayer et al. ................... 713/201 |
| 2008/0243847 | A1 | 10/2008 | Rasmussen |
| 2009/0049422 | A1 | 2/2009 | Hage et al. |
| 2009/0125494 | A1* | 5/2009 | Baby et al. ......................... 707/4 |
| 2009/0259665 | A1 | 10/2009 | Howe et al. |
| 2010/0250497 | A1 | 9/2010 | Redlich et al. |
| 2010/0287124 | A1 | 11/2010 | Nugent |
| 2010/0332456 | A1 | 12/2010 | Prahlad et al. |
| 2011/0110568 | A1 | 5/2011 | Vesper et al. |
| 2011/0196900 | A1 | 8/2011 | Drobychev et al. |
| 2012/0007881 | A1 | 1/2012 | Forlani et al. |

OTHER PUBLICATIONS

LaPlante. Dictionary of Computer Science, Engineering and Technology, CRC Press LLC. Copyright 2001. p. 327.

* cited by examiner

*Primary Examiner* — Wilson Lee
(74) *Attorney, Agent, or Firm* — Wilmer Cutler Pickering Hale and Dorr LLP

(57) ABSTRACT

A file system is disclosed that includes an application wide name space instantiated in a global index (Gindex) that is used for accessing objects related to an application. Using the Gindex, a method for cache coherency includes establishing one or more appliances, each defining a storage cluster; establishing one or more tenants spanning across appliances, wherein an application stores objects in file systems associated with the appliances and tenants; establishing a Gindex including metadata relating to objects stored in association with the application; replicating the Gindex to plurality of data centers supporting the tenants; storing an original object at a first data center; storing a cached copy of the object at a second data center; aligning the cached copy using metadata for the object from a local copy of the Gindex.

20 Claims, 20 Drawing Sheets

1700B

| GROUPING | IOPS | LOAD | AVG TIME | SATURATION | IOPS (100%) | AVG (100%) |
|---|---|---|---|---|---|---|
| ten3cdc | 600 | 21 | 31 | 113 | 2800 | 28 |
| b3_1 | 240 | 0 | 27 | 0 | 0 | 0 |
| b3_2 | 200 | 0 | 22 | 0 | 0 | 0 |

FIG. 17B

GLOBAL INDEXING WITHIN AN ENTERPRISE OBJECT STORE FILE SYSTEM

CROSS REFERENCE TO RELATED APPLICATIONS

This application claims priority to and the benefit of U.S. patent application Ser. No. 13/101,964, entitled "GLOBAL INDEXING WITHIN AN ENTERPRISE OBJECT STORE FILE SYSTEM," filed May 5, 2011, which claims priority to and the benefit of U.S. Provisional Patent Application No. 61/471,642, entitled "WORKLOAD NAME SPACE ACCESSED VIA A RESTFUL API," filed Apr. 4, 2011, each of which is incorporated by reference herein its entirety.

This application is related to U.S. patent application Ser. No. 13/101,953, entitled "APPLICATION WIDE NAME SPACE FOR ENTERPRISE OBJECT STORE FILE SYSTEM," filed May 5, 2011, which is incorporated by reference herein its entirety. This application is also related to U.S. patent application Ser. No. 13/101,956, entitled "MANAGING PERFORMANCE WITHIN AN ENTERPRISE OBJECT STORE FILE SYSTEM," filed May 5, 2011, which is incorporated by reference herein its entirety.

BACKGROUND

Increasingly, information is retrieved over a communication network. For instance, browsers are being deployed in both internet and intranet contexts to provide data access in geographically distributed environments. In some database systems, performance, availability, and communication cost issues arise when data is stored in a central location.

It has become increasingly difficult to funnel an arbitrary number of accesses to a single server site, especially as the number of accesses increases. Physical transport logistics interfere with data access. As the network access load grows at the central site, enhancing the use of wide area communications may be necessary to match the need. However, acquiring additional wide area bandwidth is expensive. In addition, increasing the bandwidth leads to considerable lead-times. As a result, a single server is unable to handle a very large load effectively. Moreover, if the central server fails, all the sites used for accessing the database are effectively down for an indefinite period of time.

Additionally, in a typical storage system data may be stored in a cloud of servers including one or more databases, application servers supporting the databases, and various backup mechanisms. These databases may be configured statically, in that physical storage systems are rigidly associated with a particular storage application. However, with the increasing use of cloud storage systems, a storage cloud is too large, and too dynamic for static configuration mechanisms to be practical. As an example, when an application is constrained to using specific storage media, that application can run out of space when there is actually free space within the data center.

SUMMARY

In one embodiment, a file system is disclosed that includes an application wide name space used for accessing objects related to an application. The file system includes one or more appliances. Each of the appliances logically define a storage cluster, for instance, a cluster file system. The file system also includes one or more tenants, each of which logically spans across the one or more appliances, or a subset of the one or more appliances. The file system also includes one or more physical file systems arranged within each of the one or more appliances. Further, one or more bucket sets define one or more corresponding physical file systems of a corresponding appliance for the tenant. Additionally, the system includes one or more application servers and storage servers servicing the application, wherein the application servers provide access to each storage servers of the physical file systems used for storing objects. The system also includes an application wide object name space that is used for accessing objects of an application, wherein the objects are stored in the physical file systems across the one or more appliances in association with the tenant. REST APIs are used for manipulating (e.g., defining and accessing) the objects related to the application through the file system. Credentials or roles for users define permissioned access to the file system, and include a regular user, a monitor, a super user, a tenant administrator, and a master administrator.

In another embodiment, a computer implementation of a method for discovery of a name space within a file system includes: establishing one or more appliances, each defining a storage cluster; establishing one or more tenants spanning across the one or more appliances, wherein an application stores objects in file systems associated with the appliances and the tenants; establishing communication between a client and a local hub providing access to the file systems; discovering a tenant under the local hub, wherein the local tenant is associated with an application; and locally mapping an application wide object name space used for accessing objects of the application stored in the physical file systems in association with the local tenant. In particular, when discovering the name space of objects stored in association with the tenant, the computer-implemented method further includes discovering one or more appliances associated with the tenant; discovering one or more appliances associated with the tenant; discovering one or more bucket sets associated with appliances associated with the tenant; discovering one or more file systems associated with the bucket sets; and discovering objects associated with the application in the file systems. The mapping process is extended to other tenants associated with the application, in that an internet protocol (IP) address is discovered for a second tenant under the local hub, and the name space is mapped for accessing objects of the application stored in physical file systems in association with the second tenant.

In another embodiment, a non-transitory computer-readable storage medium having computer executable instructions for causing a computer system to perform a method is disclosed. In that manner, within an EOS configuration meta data related to file systems within a bucket set are separately stored, mirrored, and backed-up in case of file system failure. As such, EOS file systems support a self healing process for configuration management at an appliance and bucket set level. The method includes: establishing an appliance defining a storage cluster, wherein the appliance is associated with a tenant spanning across one or more appliances such that an application stores objects in file systems associated with the tenant; establishing a bucket set including a plurality of file systems across the appliance; storing metadata related to the plurality of file systems in a first file system of the bucket set; mirroring the metadata in a second file system of the bucket set; and copying the metadata to a third file system in the bucket set when a file system containing the metadata fails. The metadata is stored in parallel in the two file systems, and includes transaction logs involving the manipulation of objects within the file systems of the bucket set, and also includes directories (e.g., name spaces) of the file systems in the bucket set. As an example, when the first file system fails, the metadata stored in the second file system is copied to the third file system within the bucket set.

In still another embodiment, a method for cache coherency between copies of objects stored at multiple locations is disclosed, and includes: establishing one or more appliances, each defining a storage cluster; establishing one or more tenants spanning across the one or more appliances, wherein an application stores objects in file systems associated with the appliances and the tenants; establishing a global index (Gindex) including metadata relating to objects stored in association with the application, wherein each object is associated with a unique object identifier; replicating the Gindex to plurality of data centers supporting the one or more tenants; storing an original object at a first data center; storing a cached copy of the object at a second data center; aligning the cached copy of the object to the original object using metadata for the object from a local copy of the Gindex. In particular, when aligning the cached copy (e.g., locally stored at a remote data center), a last modification time indicator associated with the cached copy and the original object are compared. If not aligned, then the updated original object is retrieved and stored as the new cached copy.

In another embodiment, a non-transitory computer-readable storage medium is disclosed having computer executable instructions for causing a computer system to perform a method, the method including: sending a request for an object to a primary hub supporting a file system comprising an application wide object name space used for accessing objects of an application stored in physical file systems across one or more appliances, each defining a storage cluster, in association with a tenant logically spanning across the appliances; determining that the request failed; determining a secondary hub supporting the application wide object name space; and pushing the request to the secondary hub for processing. Upon receipt of the request at the secondary hub, the secondary hub may determine that communications can be established with the primary hub, in which case the request is forwarded to the primary hub from the secondary hub for processing. Also, upon receipt of the request at the secondary hub, the secondary hub may determine that communications cannot be established with the primary hub; may also determine that a majority consensus hub cannot communicate with the primary hub, in which case the secondary hub then processes the request, wherein a replicate of the object is stored in association with the secondary hub. Also, upon receipt of the request at the secondary hub, the secondary hub may determine that communications cannot be established with the primary hub; may also determine that a majority consensus hub can communicate with the primary hub, in which case, the request is forwarded to the majority consensus hub from the secondary hub.

In still another embodiment, a method for accessing a file system, and more particularly, a method for rolling back a file system to an older state is disclosed, the method including: establishing a tenant wide name space used for accessing objects of an application stored in physical file systems across one or more appliances, each defining a storage cluster, in association with a tenant logically spanning across the appliances; establishing a global index (Gindex) including metadata relating to objects stored in association with the application under the tenant, wherein metadata for each object includes a last modification time indicator, and wherein each object is associated with a unique object identifier; accessing objects stored in file systems associated with the tenant by corresponding object identifiers through the Gindex; receiving a rollback date/time; and restricting access to the objects stored in file systems associated with the tenant, such that access is provided to objects associated with a last modification time indicator before the rollback date/time. Also, permissioned access is provided to objects associated with a last modification time indicator after the rollback date/time.

In another embodiment, a file system is disclosed that includes an application wide name space instantiated in a global index (Gindex) that is used for accessing objects related to an application. Summary workload statistics are monitored and calculated via a calibrated hierarchical service level agreement (SLA) in a method of operation that includes: establishing a tenant wide name space used for accessing objects of an application stored in physical file systems across one or more appliances, each defining a storage cluster, in association with a tenant logically spanning across the appliances; and monitoring a performance statistic for the application across the tenant. The performance statistic includes a load that is defined as the number of maximum operation count (iops) per interval measured against a calibrated threshold, and a saturation that is defined as the average latency per operation as measured against a calibrated threshold. The performance statistic is measured by workload, such as, across the tenant, across an appliance of the tenant, or across a bucket set of file systems of an appliance of the tenant. Operations performed within the tenant wide name space are rebalanced according to the performance statistics. For instance, a read mixture is adjusted between an appliance and one or more appliance replicas associated with the appliance, and a write mixture is adjusted between bucket sets of a one or more appliances, each of which are associated with the tenant.

In still another embodiment, a file system is disclosed that includes an application wide name space instantiated in a global index (Gindex) that is used for accessing objects related to an application. Summary workload statistics are monitored and calculated via a calibrated hierarchical service level agreement (SLA), and load balancing is performed in response to the workload statistics in a method of operation, including: establishing a tenant wide name space used for accessing objects of an application stored in physical file systems across one or more appliances, each defining a storage cluster, in association with a tenant logically spanning across the appliances; monitoring a performance statistic for the application across the tenant; and rebalancing operations performed by the application in the tenant wide name space in response to the performance statistic. In particular, a read mixture may be adjusted between an appliance and one or more appliance replicas. Also, a write mixture may be adjusted between bucket sets of an appliance, or between bucket sets across the tenant. Further, new objects may be allocated to a higher performing bucket set of an appliance. Moreover, a new bucket set may be created out of reserve file systems located on an appliance, and new objects are allocated to the new bucket set.

In another embodiment, a computer implemented method for providing mobile storage includes: in a first data center, establishing one or more appliances, each defining a storage cluster; establishing one or more tenants spanning across said one or more appliances in said data center, wherein an application stores objects in file systems associated with said appliances and said tenants; establishing one or more directories of said file systems; storing said directories in a first directory file system in association with said application; replicating said directories to a second directory file system in a second data center; and providing directory look-up in said directories at said second data center. More specifically, in each of the directories, a path name is provided to each objects in the directories, and objects are accessed via the path name in a corresponding directory look-up operation. Objects are stored in separate file systems. The directories are widely distributed throughout the network, such as, to other data centers. As such, when a directory look-up request is received at a second data center, a directory look-up is performed locally at the second data center, and the object is accessed from the first data center and provided in response to the request. On the other hand, if the object is replicated to the second data center, the object is accessed from the second data center and provided in response to the request. In addition, new objects associated with the application may be stored at the second data center, and directory information for that object is incorporated into the directory file system, which is then widely replicated. In that manner, objects stored in an alternate data center may be accessed from the primary data center through a local directory look-up operation.

Thus, according to embodiments of the present disclosure, an application wide name space is established that is used for accessing objects of an application stored in physical file systems across one or more appliances, each defining a storage cluster, and in association with a tenant logically spanning across the appliances. Objects are accessed via the name space via restful APIs. The name space is automatically discovered throughout the EOS configured file system. File system metadata in the EOS configured file system is backed-up on two file systems, and migrates to a third file system in the event of media failure. A Gindex is provided establishing an application wide name space used for accessing objects with object identifiers instead of path name. Appliance fail-over is pushed to an alternate server/hub by the client when experiencing service failures. An entire tenant namespace can be rolled back to a particular date/time through application of the Gindex. Performance statistics are monitored on an application, tenant, appliance, or bucket set levels as opposed to absolute performance statistics. Load balancing is performed in response to the performance statistics. A file system directory of an application in one data center is replicated throughout an EOS configured file system for providing local directory look-up operations at a remote data center.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 17B is a diagram illustrating a table showing performance statistics across a selected appliance of a tenant, both of which are associated with a tenant wide name space for an application, in accordance with one embodiment of the present disclosure.

DETAILED DESCRIPTION

Figure 1:
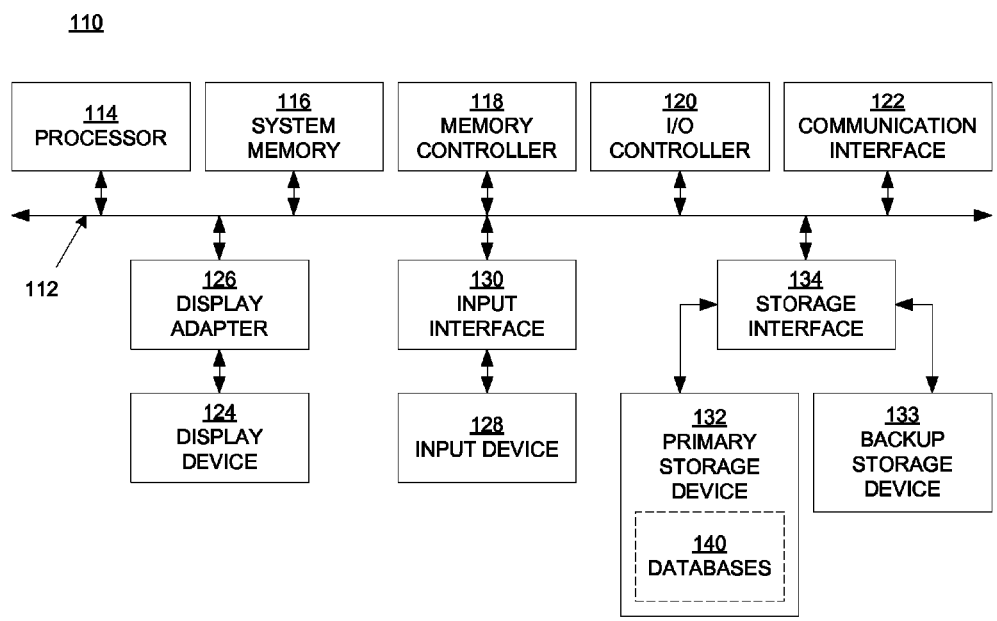
FIG. 1 is a block diagram of an example of a computing system capable of implementing embodiments of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "using," "selecting," "storing," "comparing," "indicating," "determining," "relocating," "moving," "copying," "deleting," "identifying," or the like, refer to actions and processes (e.g., flowcharts 600, 700, and 800 of FIGS. 6, 7, and 8, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
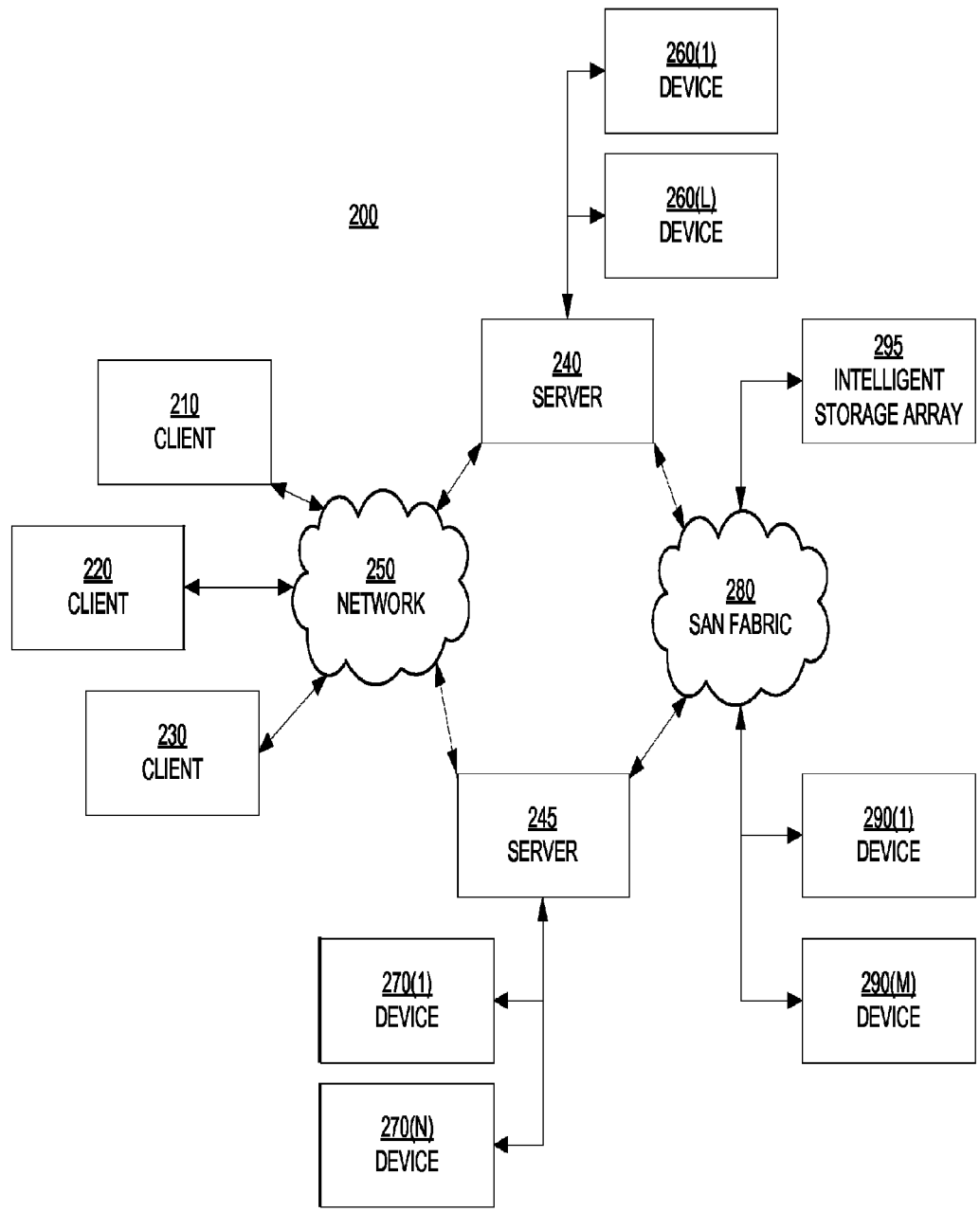
FIG. 2 is a block diagram of an example of a network architecture capable of implementing embodiments of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Enterprise Object Store Architecture

Figure 3:
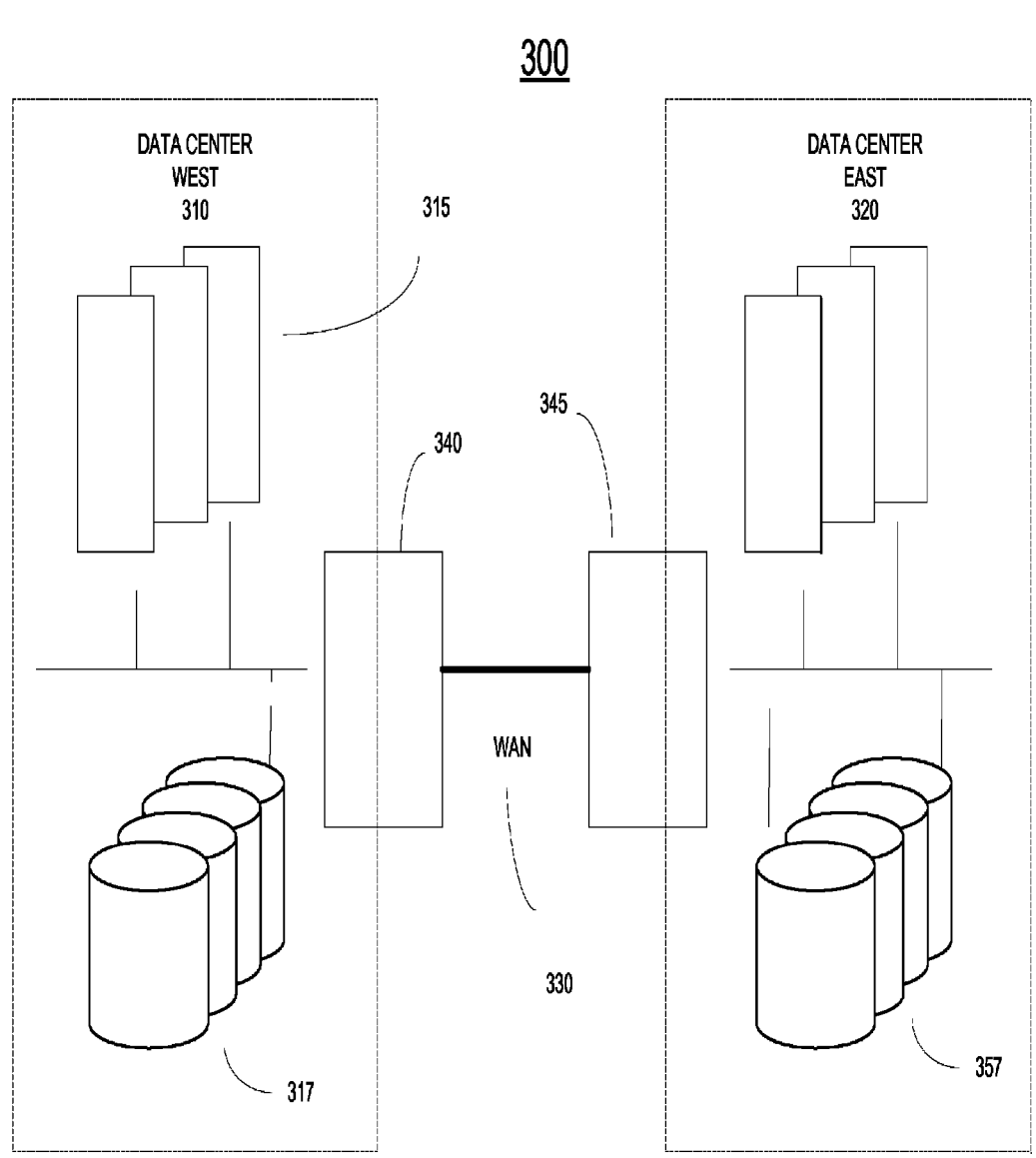
FIG. 3 is a diagram illustrating a storage cloud, in accordance with one embodiment of the present disclosure.

The enterprise object store (EOS) system implements a distributed architecture for storing data. FIG. 3 is a diagram illustrating a storage cloud of an EOS system 300, in accordance with one embodiment of the present disclosure.

Two data centers are shown in the distributed architecture, though the EOS system 300 is configured to support one or more data centers. Specifically, data center west 310 and data center east 320 (geographically named for illustration purposes) are communicatively coupled over a wide area network 330 and gateways 340 and 345 to the local network servicing each data center. One or more local area networks (LANs) are included within each of the data centers 310 and 320. As an example, a private cloud could range from approximately 2 petabytes (PBs) to 200 PB of storage.

Within the EOS system, the data centers 310 and 330 operate independently, and are able to support multiple major applications (e.g., storage as service [SaS], media repositories, archives, and distributed web applications) through commonly shared storage. Each of the data centers 310 and 320 may be configured similarly, and support the storing and accessing of a single name space of an application that combines data in multiple locations. As an example, an application is locally hosted and accessed via data center west 310 through application servers 315, and information is stored and hosted in storage servers 317. More specifically, application servers 315 connect to local appliances via representational state transfer (REST) application programming interfaces (APIs), which provides an hypertext transfer protocol (http) interface to the underlying file system. Information stored in servers 317 may be replicated in servers 357 of data center east 320 for back-up and access purposes.

Further, a discovery model allows storage additions in one site or data center to be visible in other sites without requiring specific reconfiguration. Specifically, an object global index (Gindex) is stored in each of the data centers 310 and 320 that is useable for searching for the object in the application name space, as will be further described below in relation to FIGS. 11 and 12. In other implementations, the Gindex is replicated in each of the LANs included within the data centers 310 and 320. In that manner, the Gindex is replicated throughout the EOS system and can be accessed locally, instead of through the host system to reduce WAN traffic.

Figure 4:
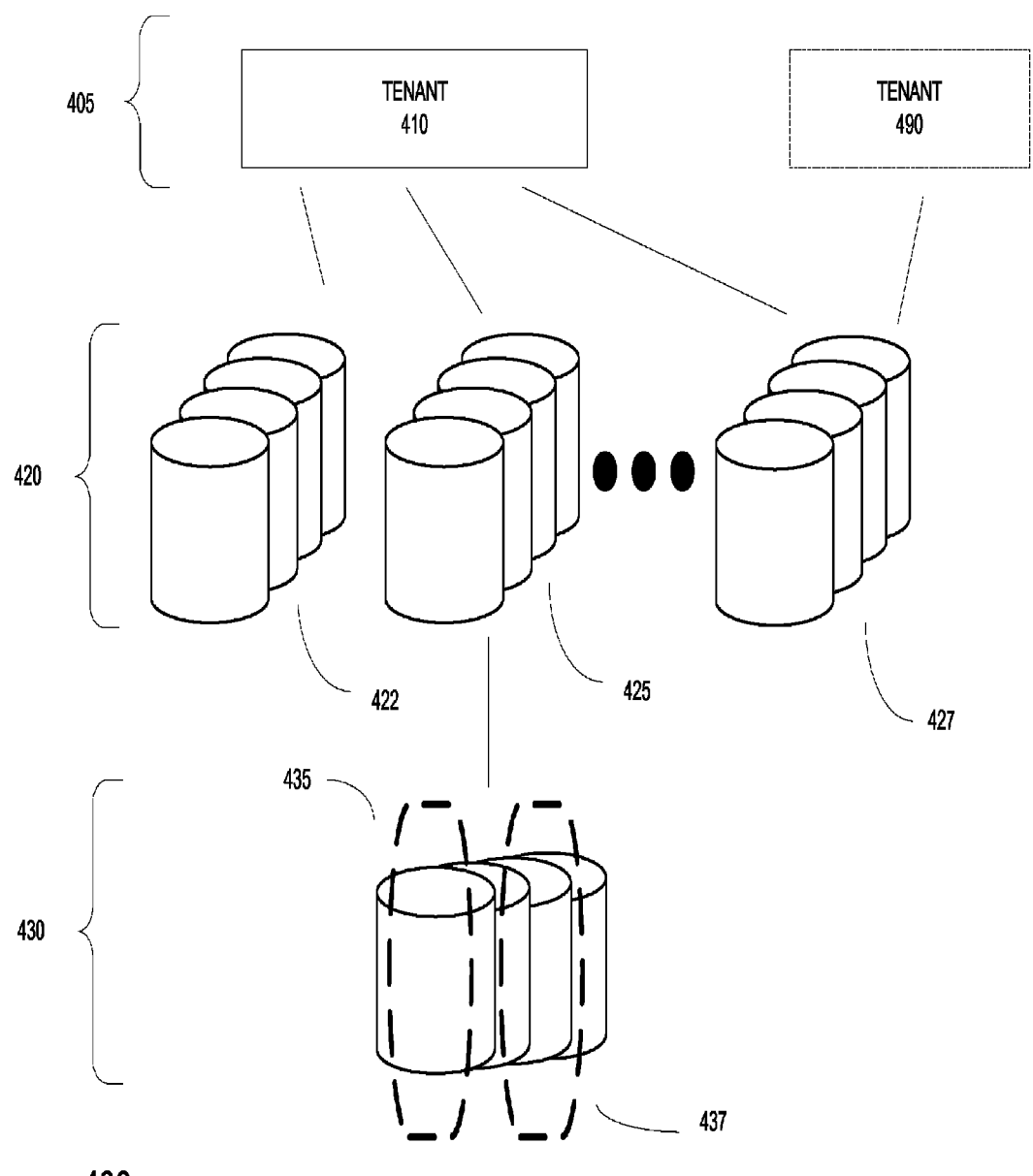
FIG. 4 is a diagram illustrating the hierarchical relationship between tenants, appliances, and storage pools, in accordance with one embodiment of the present disclosure.

FIG. 4 is a diagram illustrating the hierarchical relationship between tenants, appliances, and storage pools in an EOS system, in accordance with one embodiment of the present disclosure. For instance, an application associated with a tenant, one or more appliances, and one or more storage pools for storing data may be implemented within the EOS system 300 of FIG. 3, in one embodiment.

A tenant is a workload definition. That is, the EOS name space is by workload (tenant). More specifically, a tenant consists of a set of internet protocol (IP) addresses which host the tenant, set of servers (name and ip), a series of storage pool, templates and a set of users with credentials (e.g., private keys) used for security management. One or more tenants are associated with an application, such as, an email archiver, which is able to service one or more clients (e.g., corporations).

In a working example, in the EOS system, an email archiver application services five hundred or more corporate clients. The EOS system may be configured such that each of the clients is associated with a particular tenant. As shown in FIG. 4, an application layer 405 is defined by one or more tenants. For instance, one application (e.g., email archiver) may be associated with tenants 410 and 490.

A tenant can span any number of servers (appliances). As shown in FIG. 4, appliance layer 420 includes one or more appliances (e.g., appliances 422, 425, 427, etc.). More particularly, each of the appliances is associated with a file cluster. For instance, an appliance can be a free standing appliance such as FileStore, above Storage Foundations cluster file service (CFS) for high availability/high performance configurations, or any Linux server. In one implementation, configuration management for a tenant may be provided by two storage appliances.

Node names in EOS are of the form <cluster>-node, where a node number is used to identify clusters, in one implementation. For example, mv1-0 and m1-1 and mv2-0 defines a cluster. For instance, mv1-0 combined with mv1-1 defines both nodes of a two node cluster. In one embodiment, EOS will run in clustered mode, with similar configurations used in a cluster file service. For appliances/servers that are not clustered, node number is set to zero, in one implementation.

For purposes clarity and illustration, Table 1 illustrates the configuration for a four node tenant, which is mastered on node mv1-0. When creating and administering a tenant, two administrative master nodes (m1, m2), the primary and alternate, are chosen in one implementation. The original creation message is sent to the m1 node. All EOS configuration information is in text format, in one implementation, which is similar in appearance to restful headers. For example, Put /admin/rest?NewTenant sent to the m1 node, creates a new tenant. The configuration is in the message body.

TABLE 1

Four Node Tenant

Ip-mv1-0: 123.456.789:80 usaw usae
Ip-mv1-1: 124.456.789:80 usaw usae

TABLE 1-continued

Four Node Tenant

Ip-nyc1-0: 125.456.789:80 usae usaw
Ip-cdc-0: 126.456.789:80 chn usaw
m1: mv1-0
m2:nyc1-0

As shown in Table 1, there is configured a four node tenant, mastered on mv1-0. The configuration for the master is representative of each of the nodes and includes an IP address, a local zone (usaw) and its nearest neighbor (usae). A zone is likely a set of servers/appliances on a common LAN. Additional nodes can be added at any time, without requiring a service interruption. Three zones have been defined, USA East and West, and China. EOS is designed to support geographically distributed applications, including support for multi-geo replication, and as such, each EOS node has a concept of location called a zone, and the zone nearest to it (e.g., neighbor). Internally, EOS uses this information to find the nearest service location, and location information is also available to applications via mapping operations.

Within an appliance, the underlying storage could be a network file system (NFS) client. As such, the EOS system can connect to virtually any form of underlying physical storage. More specifically, EOS is virtual, and takes advantage of a storage cloud, wherein the cloud may include hundreds of appliances, with a number of different configurations. An appliance is identified by an internal node name, and an IP:port, in one implementation.

Thus EOS has no concept of a file system or volume. An EOS storage specification is a directory, for example on any Posix conforming file system, including network file systems. Within a single appliance, an EOS name space can also span multiple directories (e.g., physical file systems), thus EOS storage is defined as a series of storage pool templates, wherein the storage pool includes one or more file systems, and more particularly a collection of mounted directories. For instance, as shown in FIG. 4, appliance 425 is associated with one or more storage pools or file systems 435 and 437 at the storage pool layer 430. Not all storage pools are shown for each of the appliances within FIG. 4. In addition, not all directories in a pool need to be present on all appliances, thus a pool definition is merely a template, allowing EOS directory naming to be consistent across a number of appliances, with variable numbers of physical file systems.

Table 2 provides an exemplary definition for storage pool 1 which has three regular directories, plus solid state devices (SSDs). EOS is configured to support SSDs directly, and if SSD devices are specified, EOS places index databases on these devices, but not objects (e.g., files), in one embodiment. When EOS bucket sets (storage within a single appliance) are defined, the specification includes the pool to use. Additional directories can be added to a pool definition at any time, without a service interruption.

TABLE 2

Storage Pool Definition pfs-1-fs1: /mnt/fs1
pfs-1-fs2: /mnt/bigfs
pfs-1-fs3: /mnt/anotherfs
ifs-1-ssd1: /ssd/ssd1

More particularly, a tenant may contain any number of bucket sets, and thus is not size constrained. More than one tenant may be hosted within a single appliance, but tenants do not need to span an entire storage cloud. For instance, tenants 410 and 490 are hosted within appliance 427. It is assumed that segmentation will be desirable, for ease of administration.

Storage is allocated on individual appliances by a second level configuration entity known as a bucket set. Abstracted further, storage for a tenant within a single appliance is within one or more bucket sets. A bucket set is an approximation of a file system. A bucket set can only contain storage within a single storage pool on any cluster. A bucket set can be replicated across multiple appliances, but a bucket set cannot be larger than an appliance. A tenant storage pool template could be all or a portion of a particular appliance. SSD is supported, to allow EOS indexes to be stored on fast media.

A bucket set is an instantiation of a tenant storage pool template on a set of appliances (up to 32 replicas). There is no limit on the number of bucket sets within a tenant, but in one implementation, a tenant contains up to 128 nodes and/or appliances.

Within an EOS bucket set, there is a transaction log, and two databases, one for buckets and one for objects within buckets, in one embodiment. The transaction log and databases are stored on two file systems, with databases using SSD if available. Thus, if a single file system becomes unavailable, log and directory information is not lost. For example, Table 3 illustrates bucket set definitions.

TABLE 3

Bucket Set Definition

/fs1/<mytenant>/<mybset>/log - a log directory for a bucket set
/fs1/<mytenant>/<mybset>/db - data base
/fs1/<mytenant>/<mybset>/tmp - temporary objects
/fs1/<mytenant>/<mybset>/d[0-1023]/d[0-1023]/object - permanent objects Note that that any number of tenants and bucket sets can independently share the same physical storage, as their root directories include the tenant and bucket set name. All object references within a bucket are stored in a single database table, but objects themselves will be evenly distributed across all file systems in a pool.

Bucket set assignment for an appliance depends on various factors, including average object size, read/write ratio, and object replacement rate. As a rule, the more meta data intensive the workload, the more bucket sets will be required to achieve comparable performance. For example, with a large average object size (e.g., 1 Mb), and long lived objects, one bucket set per tenant per appliance is sufficient. A meta data intensive workload will run faster if there are more bucket sets, as there are more logs and databases that can be updated in parallel.

Figure 5:
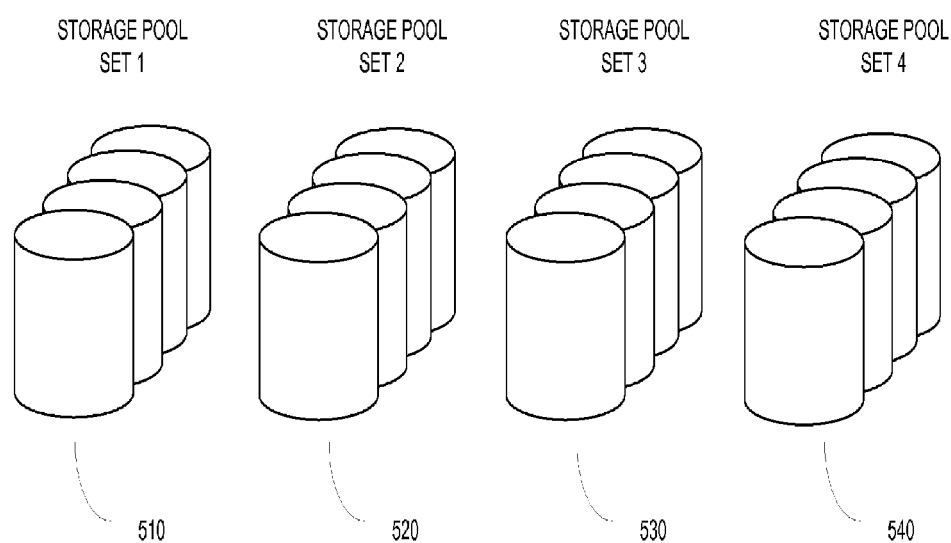
FIG. 5 is a diagram illustrating an enterprise object store (EOS) configuration having one storage pool per appliance in a tenant, in accordance with one embodiment of the present disclosure.

FIG. 5 is a diagram illustrating an EOS configuration 500 having one storage pool per appliance in a tenant, in accordance with one embodiment of the present disclosure. For instance, an application can use an EOS tenant as embedded storage, and limit all access credentials to those within the application, including administrative access. The assumption is that a set of appliances would be reserved for exclusive use of an enterprise application. A real world example is a photo archive, or an email archive.

As shown, the application includes a tenant with four appliances (510, 520, 530, and 540). Each appliance is configured as a single storage pool. That is, one file system supports an appliance. For instance, appliance 510 is associated with storage pool set 1, appliance 520 is associated with storage pool set 2, appliance 530 is associated with storage pool set 3, appliance 540 is associated with storage pool set 4. The shown configuration is appropriate for read intensive workloads. On the other hand, a write intensive workload with small objects (meta data intensive) will require additional bucket sets to be defined on each appliance, to avoid transaction log bottleneck. The bucket sets can share a common storage pool that spans the entire appliance. As the load increases, one or more appliances may be added, such that corresponding bucket sets in a one-to-one relationship are added to the tenant associated with the application. At start up, the application maps the tenant to determine what bucket sets have been configured.

Within this model, there is a choice to either use object mapping by identification (ID) or by pathname, and whether to use bucket only bucket sets, bucket and object bucket sets, or mixed mode. With this model, unless the application wishes to create a large number of tenants, mechanisms such as a global index (Gindex) map would not be required, and all tenants could be defined on all nodes in the cloud segment reserved for the application. But even a large single enterprise application such as a mail archive, may wish to create a large number of tenants. For example, if there are say 500 corporate clients, each with several hundred to thousands of mail accounts, it may be desirable to create a tenant per client, and thus a mapping Gindex would be desirable.

The terms bucket and object correspond to directory and file. In general, entire objects are replaced, as opposed to parts of files being replaced by a write( ) operation. Objects can also be versioned, in one embodiment. Again, storage for a tenant within a single appliance is named a bucket set.

An example of an object Get within a bucket set is defined as follows:

"Get/rest/<mytenant>/<mybucketset>/dir1/dir2/myobject."

A bucket set (in this case named mybucketset) can consist of 1 or more replicas, either single or multiple version, in one embodiment. Similar to tenants, two of the replicas are defined as m1 and m2, the master nodes for maintaining consistency. A bucket set is configured by sending a /admin API operation to the m1 node for the containing tenant.

There are two forms of bucket set replicas, standard and versioned backup, in embodiments. A versioned backup, as the name implies, implements a versioning of underlying directories and objects, suitable for backup/restore.

EOS supports both synchronous and semi-synchronous replication, in embodiments. If synchronous replication is used, the primary node for a bucket set will automatically fail over to a dual. The model is selected via the m1 m2 specifications for a bucket set, wherein m1 is the default primary. All consistency transactions (not all operations) are processed by the primary. If m2 is specified, it becomes a dual that can assume the role of primary automatically if the primary becomes unavailable. Replication to the dual is synchronous, meaning that a transaction is logged on both primary and dual before being applied to the name space. In other embodiments, other replicas are semi-synchronous. Transaction logs are scheduled to be sent to replicas immediately. Also, it is possible to change the primary and dual for a bucket set via the /admin API.

TABLE 4

Three Replica Bucket Set

Gindex: local <tenant> <user> | remote <tenant> <service> <user>
Callback: local <tenant> <user> | remote <tenant> <service>

TABLE 4-continued

Three Replica Bucket Set

```
<user>
  Local-Objects: true | false
  c1-mv1-1: pool 1
  b2-cdc1-0: pool 2
  c3-nyc1-0: pool 1
  m1: mv1-1
  m2:cdc1-0
```

In Table 4, a three replica bucket set has been defined. The second replica is multiple version, such that when objects and buckets are deleted, they are retained as versions. A versioned Get operation provides access to specific versions of objects.

A bucket set can be defined to either force or preclude objects from being stored in the same bucket set as the buckets themselves, in embodiments. The default is that objects are first placed in the same bucket set as the bucket, and then placed within the alternate tenant for the containing tenant.

As such, there are three storage models. In the first model, objects and buckets are stored in the same bucket set. The maximum amount of storage is one pool, within one appliance. In the second model, an alternate tenant is used as reserve storage, so that if an appliance is completely full, objects use free space on other appliances. In the third model, a mobile storage/very high throughput model is used. Objects are widely distributed, thus file access is evenly distributed across a set of appliances (a fast network, slower disk access assumption). The directory space within a file system is a small fraction of total storage, thus directory only name spaces can be effectively replicated across a WAN, enabling efficient mobile storage.

Note that any number of bucket sets can share a common storage pool, and any number of storage pools across any number of tenants can contain common physical file systems. Storage partitioning is possible, but not necessary, and in most cases, not recommended. Since storage clouds are very large, system administration must be simple and consistent, and letting the EOS system handle load balancing and free space management is preferable to a manual model.

EOS supports credentials for security, in one embodiment. There are two forms of credentials, global and per tenant. Global credentials generally apply to operations which span multiple tenants. In one implementation, EOS primarily supports Digest authentication, within the restful header for each operation: Authentication: user:signature. The client has the private key, and the private key that the EOS configured file system has for the 'user' must match. If the keys do not match, the calculated 'signature' will not match the restful header, and any corresponding operation will be rejected.

In one case, _name is a small pool that spans multiple tenants. This is used at installation so that a credential exists before the first tenant is created, or to allow administrative operations that are outside of, or span multiple tenants. Operations within a tenant can use a global credential, but normally, per tenant credentials are used. For instance, at installation, _eosa a "123" is installed as a credential. The system administrator logs in to the administrative GUI with this credential, and then starts customization, including changing "123" to a more secure private key.

Credentials are stored in various locations. For instance, _credentials are stored in the home EOS directory. Per tenant credentials are stored in the configuration for a tenant. Idaho credentials are applied to a per client model with thousands to millions of users, and stores them in the Gindex that is shared by multiple tenants. Service Oriented Architecture (SOA) credentials are stored in a remote service, such as, a lightweight directory access protocol (LDAP) service.

Each user has a private key (magic) that is used to create a signature. EOS validates the signature. A credential consists of a user id, a role, and a magic. Table 5 illustrates exemplary installation credentials for an EOS system.

TABLE 5

Installation Credentials

_eosa: a 123 - a master administrator
_eost: t 123 - a tenant administrator
_eoss: s 123 - super user
_eosm: m 123 - a monitor operator
_eosu: u 123 - regular user Table 6 is an illustration of credentials that are part of an exemplary tenant configuration. In the example, EOS supports the concept of a super user and a regular user. The difference between the two involves the effective owner of newly created buckets, and effective group ID for Access Control Lists. For instance, a super user can change his effective identity. Also, the type of credential used is application environment specific. For example, a mail application that maintained a mail archive for multiple users would be privileged. A per client application restricted to a single home directory would not.

TABLE 6

Installation Credentials eosa:a abhjk
super1: s abcd
user1: u defg

The _eosa and eosa credentials are the global and per tenant versions of an administrator's credential. For simple configurations such as embedding EOS within an enterprise application, global credentials are likely sufficient. A single credential with a Super User role could serve all application tenants.

In one embodiment, EOS supports a /fs file system protocol, for example Posix over Http. In the example, any legacy Posix file system can be included in a storage cloud of an EOS system. The EOS service just becomes an additional local application, and thus EOS access is generally compatible with local access. For instance, Table 7 illustrates a sample tenant pool and a partial definition of a file system protocol bucket set.

TABLE 7

Sample Tenant Pool with File System Protocol pfs-1-fs1: /mnt/fs1
pfs-1-fs2: /mnt/bigfs
pfs-1-fs3: /mnt/anotherfs
fs-mv1: pool 1

A request: "Get /fs/<mytenant>/<mybucketset>/fs1/dir1?ReadDir" is executed as follows. Within the /fs API the first level directory under a bucket set specifies a logical file system name within a tenant pool. Thus, the above request will perform a "ReadDir" API on /mnt/fs1/dir1. The /fs API allows access to legacy file system objects.

Workload Name Space Accessed Via RESTful API

In one embodiment, a file system is disclosed that includes an application wide name space used for accessing objects related to an application. The previously described EOS file system is used to manipulate objected in the file system through the name space.

Figure 6:
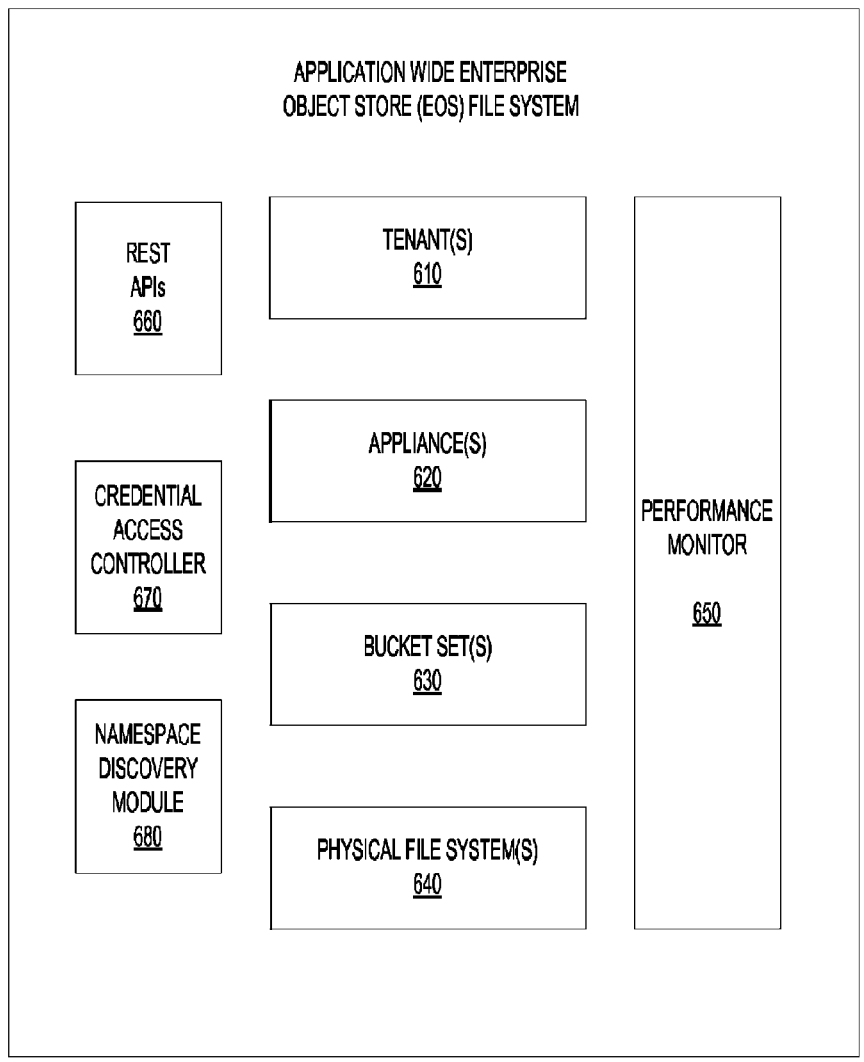
FIG. 6 is a block diagram illustrating an application wide EOS file system, in accordance with one embodiment of the present disclosure.

In particular, FIG. 6 is a block diagram illustrating an application wide EOS file system 600, in accordance with one embodiment of the present disclosure. The application is a major application servicing an enterprise. For instance, the application may be an archiving application (e.g., email archiver) run by an enterprise, wherein the application provides archiving services to multiple clients. Objects in the EOS file system for the application are manipulated (e.g., defined, accessed, etc.) through an name space that is defined by workload (e.g., application, tenant, appliance), as opposed to a file system that is partitioned by physical resources.

As shown in FIG. 6, the application is associated with one or more tenants 610. In the EOS file system 600, workload is partitioned by application, by tenant, or by appliance. Each tenant logically spans across one or more appliances 620, wherein each appliance logically defines a storage cluster, for instance, a cluster file system. Multiple workloads (tenants) are able to securely and independently manipulate objects through a common storage cloud. As such, the EOS system provides layers of abstraction (e.g., tenant and application abstraction layers) over physical storage.

The file system also includes one or more physical file systems 640 arranged within each of the one or more appliances. That is, each appliance may include one or more physical file systems clustered together. Further, one or more bucket sets 630 define one or more corresponding physical file systems of a corresponding appliance for the tenant. That is, a bucket set defines physical file storage systems available to a tenant within a corresponding appliance. In one embodiment, a bucket set is available to one or more tenants. Additionally, the system includes one or more application servers and storage servers servicing the application, wherein the application servers provide access to each of the storage servers of the physical file systems used for storing objects.

The system also includes an application wide object name space that is used for accessing objects of an application, wherein the objects are stored in the physical file systems, as per bucket set, across the one or more appliances in association with the tenant.

A bucket set is a subset of the tenant name space. It is storage accessible by that tenant on a single storage appliance. For instance, the request for an object may take the form: Get/rest/tenant1/bucketset1/d1/object.txt. For illustration purposes, the EOS file system may impose a restriction of 128 bucket sets per tenant. Where there is a one-to-one relationship between bucket sets and appliances, a single tenant name space cannot be larger than 128 storage appliances. However, the number of file systems in an individual bucket set is not restricted. For example, assuming 100 terabytes (TB) per storage appliance, a single tenant could access 12.8 PB.

Within the EOS file system, and more particularly, within the EOS application wide name space, new bucket sets (implying new appliances) and new file systems (within a single bucket set) can be added without a service interruption. Once added, these physical file systems within the bucket set are immediately detectable and accessible.

The EOS file system supports many APIs that are used for manipulating (e.g., defining and accessing, etc.) the objects related to the application. In one embodiment, a Representational State Transfer (REST) provides the model for APIs. The REST APIs provide an http interface to the EOS file system for accessing, define, and delete objects. The restful name space is private to each application. In one embodiment, EOS supports five protocols: 1) Rest—a bucket/object API; 2) Fs—Access to legacy Posix file systems via http; 3) Soa—Plug in applications; 4) Admin—EOS administration; and 5) Mon—Eos monitoring In particular, the restful model implements a bucket/object model, making extensive use of standard http header conventions. That is, the restful API provides a mechanism to create buckets and objects within bucket sets, associate possibly indexed meta data with buckets and objects, and provide a search capability. For example, the following REST request: "Get 123.456.789:80/rest/mytenant/mybucketset/d1/d2/myobject.txt" gets myobject.txt, from directory d1/d2, within mybucketset, and within a tenant called mytenant.

As EOS supports restful APIs, operations are of the form "Get /rest/tenant . . . Put /rest/tenant . . . , Get /admin/tenant . . . , Get/mon/tenant . . . , Get /fs/tenant, Get /soa/tenant . . . etc.", which enter the server via an http server. In addition, EOS operations including configuration management are restful, and thus data such as current performance statistics are available via the name space. In addition, standard restful API features derived from RFC 2616 are available to the EOS file system. For example, supported standard restful API features include "Content-MD5", "Content-Length", "Authorization", "Content Encoding", "ETAG", "Connection", "IfOModified-Since", "If-Match", "If-None-Match", "Get Range" (e.g., bytes 333-444), "Put Range" (e.g., bytes 33-444/555), and "?Version" query string for versioned object access.

In embodiments, the EOS file system supports either an object store or native file systems (e.g., Veritas File System). As such, restful APIs allow legacy data to be accessed within a distributed EOS http centric permissions infrastructure. This allows a cloud application using the EOS file system to access legacy storage using a compatible API.

In one embodiment, credentials or roles for users define permissioned access to the file system. In one embodiment, the security model supports digest authentication mechanism, including support for roles, wherein each restful header needs to contain an authorization (e.g., id/signature entry). Authentication, other than for the master administrative account, which is configured during initial installation, is per tenant.

There are five roles or credentials defined within the security model, and include a regular user, a monitor, a super user, a tenant administrator, and a master administrator. A regular user can only perform operations within the /rest and /fs prefix. A monitor can access statistics and audit logs (/mon prefix). A super user has more access than a regular user. The tenant administrator is able to perform bucket set administration within a single tenant, but cannot change the configuration of the tenant. The master administrator account can perform any operation in the EOS file system.

Furthermore, performance statistics and service level agreements (SLA) are per workload, and available within the restful API, as opposed to aggregate statistics typically based on physical configuration subsets. Thus, the input/output performance of an application is determinable within the EOS file system, for any point in time.

Discovery Based Name Space Configuration

A storage cloud is too large and too dynamic for static configuration mechanisms to be practical. In embodiments of the present disclosure, the EOS file system is able to automatically discover what is in the name space of an application, as opposed to having an extensive client side configuration to maintain.

More specifically, within a tenant there are mapping operations which return the nodes, pools, and bucket sets within the tenant. Additionally, there is a per bucket set mapping operation, such that file systems associated with the tenant are mappable. Thus, the topology of a tenant is completely discoverable, once an application knows the IP address of any node in the tenant, and has an appropriate access credential.

Figure 7:
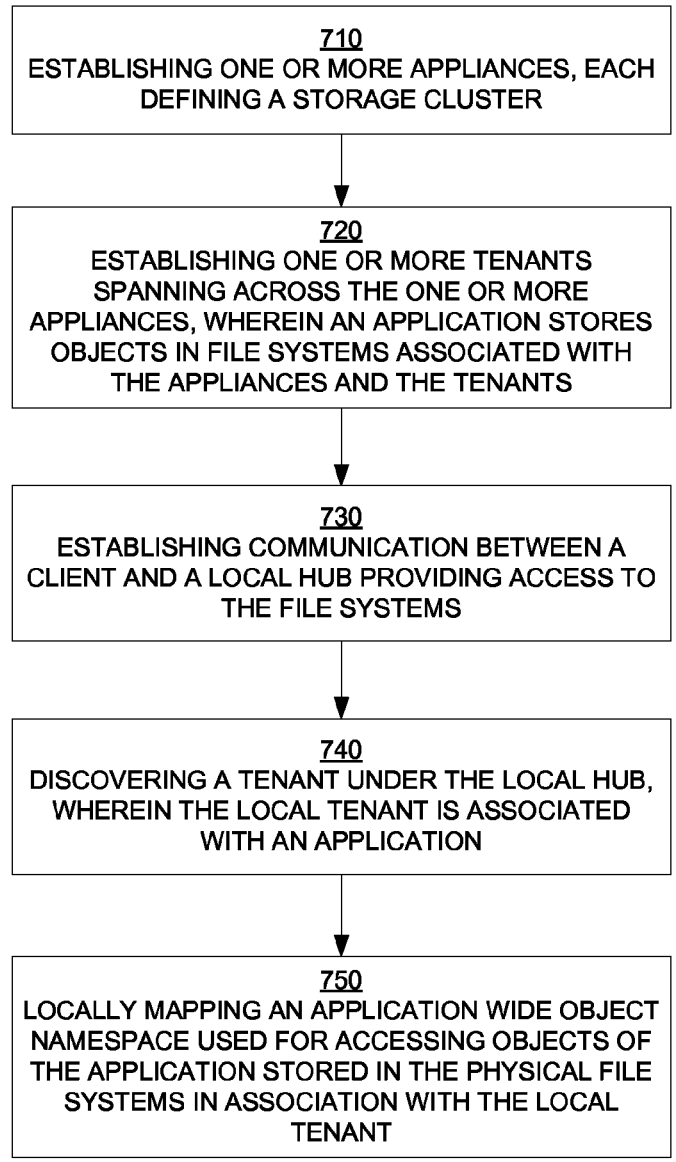
FIG. 7 is a flow chart illustrating a computer-implemented process for automatically discovering a name space within an EOS file system, in accordance with one embodiment of the present disclosure.

FIG. 7 is a flow chart 700 illustrating a computer-implemented process for automatically discovering a name space within an EOS file system, in accordance with one embodiment of the present disclosure. For instance, the process outlined in flow chart 700 is implemented by the name space discovery module 680 of the EOS file system 600 in FIG. 6, in one embodiment.

In blocks 710 and 720, an EOS file system is established. Specifically, at block 710, one or more appliances are established. Each of the appliances define a storage cluster for storing objects. In addition, at block 720, one or more tenants are established, wherein each tenant may span across one or more of the appliances. A tenant is defined by workload, and may be associated with an application, wherein one or more tenants may be associated with the application. The application stores objects in underlying file systems that are associated with the appliances and the tenants. In particular, a bucket set defines one or more file systems that are available to a tenant configuration within a particular appliance. Further, each appliance may be associated with one or more bucket sets for a particular tenant.

At block 730, communication is established between a client and a local hub providing access to the file system to the client. For instance, the local hub may provide access to a data center that is supported by a LAN, as shown in FIG. 3. In addition, the local hub may be a node within the data center through which a client is accessing the EOS file system.

At block 740, a tenant is discovered under the local hub. The tenant is associated with an application that stores objects under the EOS file system. More particularly, one or more appliances are discovered under the particular tenant. Each appliance defines one or more nodes for storage, such as a cluster file system. In addition, one or more bucket sets are discovered, wherein each bucket set is associated with a corresponding appliance of the tenant. Moreover, one or more file systems are discovered for each bucket set, such that objects are stored in a tenant by appliance, by a bucket set associated with the appliance, and by a file system associated with the bucket set. Further, objects associated with the application are discovered in the file systems associated with the tenant.

In that manner, at 750, an application wide name space is mapped through discovery operations implemented at the local hub. The name space corresponds to objects of the application that are stored in physical file systems associated with the tenant. More particularly, the name space corresponds to objects stored in bucket sets defining one or more physical file systems associated with the tenant.

Expanding the process, all tenants and all applications are discoverable through discovery operations implemented at the local hub. For instance, an IP address to a second tenant under the local hub is discovered. The second tenant is associated with the application. By establishing communication with the second tenant, the topology of the name space for the application is extended to the second tenant. That is, the name space is mapped for accessing objects of the application that are stored in physical file systems associated with the second tenant. Continuing the process for all tenants associated with the application, the entire name space for objects stored in association with the application is discoverable, in one embodiment.

In particular, the configuration of EOS is part of the EOS API, enabling auto reconfiguration, and topological discovery for optimal path routing. As an example, a restful credential, plus two IP:PORT specifications provides enough information to completely map an EOS cloud segment. The EOS monitor (e.g., graphical user interface [GUI]) monitors all nodes within a defined global index (Gindex) map. In particular, a Gindex tenant can be used as a tenant map to define a domain by implementing a service API. By default, it monitors all tenants that are directly configured on the appliance used as a web server for accessing the EOS file system.

Restful APIs are used to discover the topology of an application name space. For instance, the request "Get /rest? Map" retrieves the applications (in association with one or more tenants) that are recognized by an appliance. Also, the restful request "Get/rest?Service" returns all tenants attached to the node that processes the request. In addition, the restful request "Get /rest/tenant? Map" determines which appliances host storage for the application.

More generally, the restful request "Get /rest/<tenant>?Service" returns all _service records in the file system, such as, when a global index is used for mapping. As such, the service request returns a list of tenants, their type, and the node name, zone, and IP address of a primary and secondary gateway node. The primary gateway is used to access the EOS file system through a local hub, for example, and the secondary gateway is used to access the EOS file system (e.g., replicated objects) through an alternate node or data center, as shown in FIG. 3.

Furthermore, a gateway model is used to replicate all appliances and discover their name spaces in the cloud, in other embodiments. In that manner, objects originally stored in association with a local hub may be accessible through that remote gateway. For instance, the computer-implemented method is able to discover an IP address to a remote gateway; establish communication between the client and the remote gateway; discover a remote tenant under the remote gateway, wherein the remote tenant is associated with the application; and store or access an object related to the application in a bucket set associated with an appliance of the remote tenant.

In one embodiment, permissioned access is verified for the client when discovering the name space of a tenant. Specifically, permissioned access is determined for accessing bucket sets associated with a client. Credentials are verified through the following request, "Remote-admin: t private_key". As previously described, EOS restful credentials include role definitions (a—admin, t—tenant admin, s—super user, m—monitor, and u—standard user).

Redundant Self-Healing Meta Data

EOS file systems support a self healing process for configuration management at an appliance and bucket set level, in accordance with one embodiment of the present disclosure. The EOS file system has high availability characteristics superior to those of legacy file systems. Specifically, meta data related to file systems within a bucket set are separately stored, mirrored, and backed-up in case of file system failure, in embodiments of the present disclosure. In that manner, a single file system instance is partially redundant in that the metadata is mirrored and backed-up.

Replication of the underlying object storage is treated separately than the mirroring of metadata of the underlying file systems of a bucket set. For replication of objects, EOS configurations of file systems support a dual appliance model for configuration management, and object access. A tenant and a bucket set can be defined to have two masters (primary, dual) and in the event of a complete appliance fail over, the EOS system will automatically fail over the associated service to the dual. Within the admin API, these masters will be referred to as m1 and m2.

Figure 8:
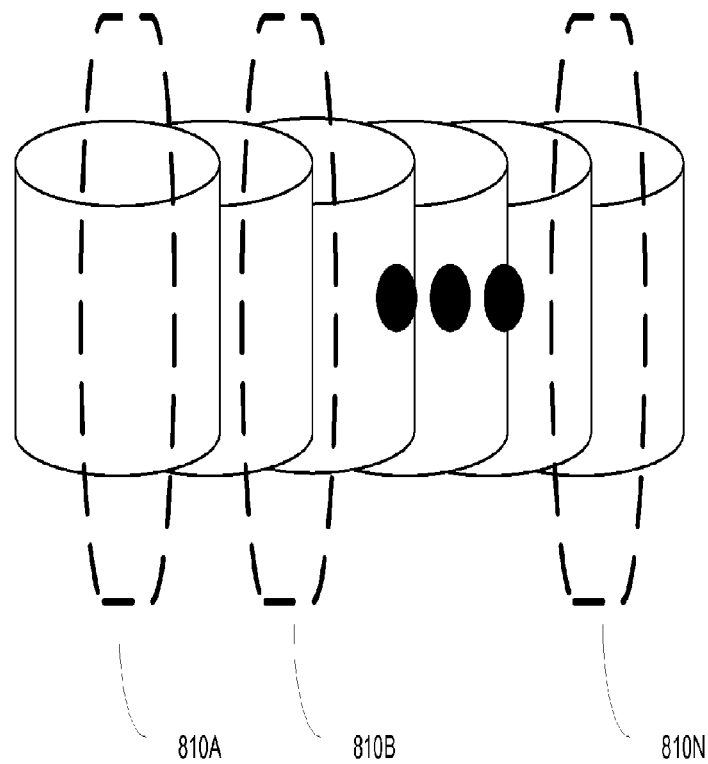
FIG. 8 is a diagram illustrating an appliance and bucket set relationship in an EOS configuration, in accordance with one embodiment of the present disclosure.

FIG. 8 is a diagram illustrating an appliance and bucket set relationship in an EOS configuration, in accordance with one embodiment of the present disclosure. Specifically, the appliance 800 includes one or more storage systems, such as that configured in a cluster of storage systems. In addition, file systems may utilize storage in and across any of the storage systems associated with the appliance. For example, within the appliance 800, file systems 810A-N are available for storing objects. These file systems 810A-N may be grouped together in one or more bucket sets, wherein each bucket set defines a specific group of file systems within a single appliance that are available to the overarching tenant. Consistent with EOS file system, objects stored in file systems 810A-N are associated with an application as configured under a tenant, appliance, bucket set relationship, as previously described.

Figure 9:
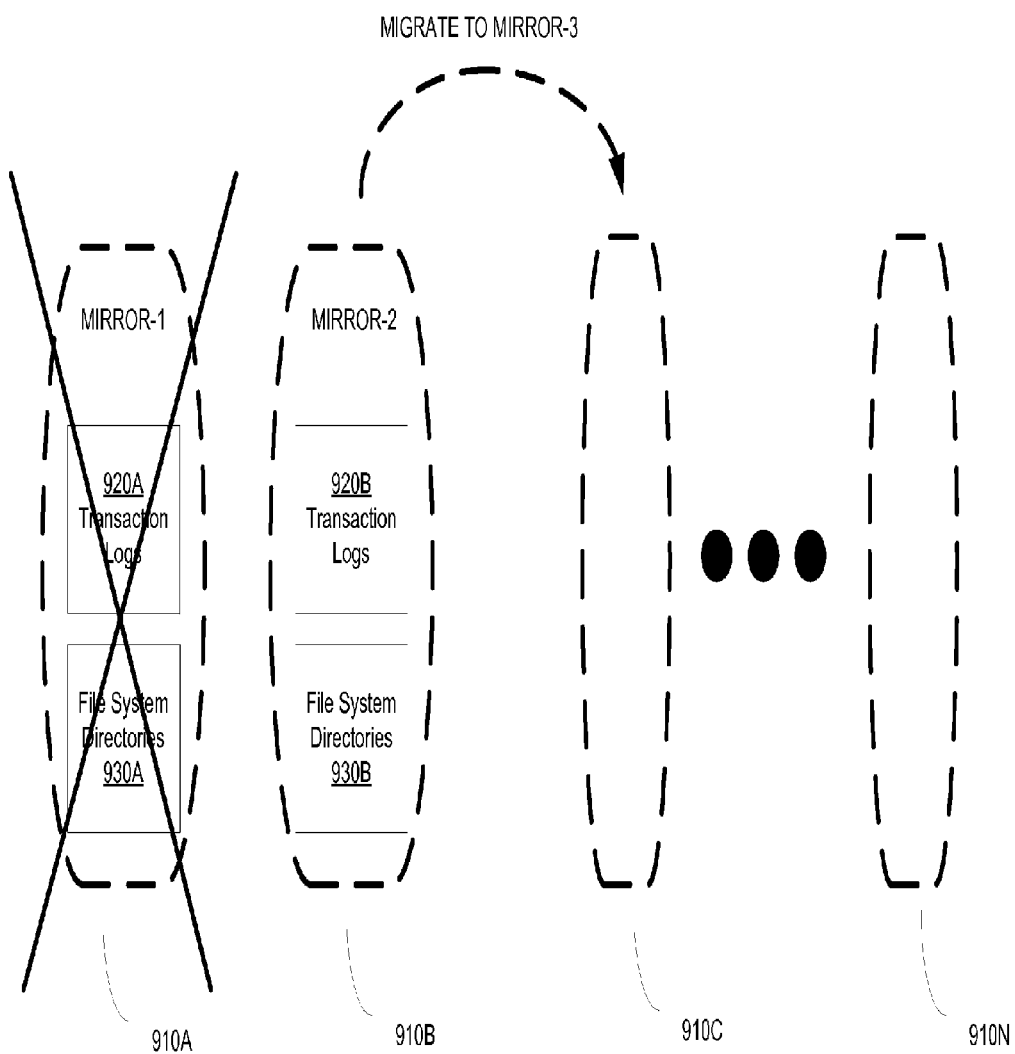
FIG. 9 is a diagram illustrating the migration of copies of transaction logs and file system directories of a bucket set upon failure of a file system containing those logs and directories, in accordance with one embodiment of the present disclosure.

FIG. 9 is a diagram illustrating the migration of copies of transaction logs and file system directories of a bucket set 900 upon failure of a file system containing those logs and directories, in accordance with one embodiment of the present disclosure. As shown in FIG. 9, the bucket set includes more than one file system 910A-N.

In addition, metadata is stored on a dedicated file system within the bucket set 900. More specifically, metadata related to the file systems in the bucket set 900 are stored on a dedicated file system. As such, metadata related to one file system is stored in a database that is located on another file system in the bucket set 900. For instance, file system 910A includes a database 920A including transaction logs relating to transactions of the file systems in the bucket set 900. In addition, file system 910A includes a database 930A including file system directories of the file systems in the bucket set 900.

The metadata for the file systems is mirrored within the bucket set 900. That is, file system 910A contains a first mirrored copy (mirror-1) of the metadata and file system 910B contains a second mirrored copy (mirror-2) of the metadata. For instance, file system 910B includes a database 920B that is a mirrored copy of database 920A, both of which includes transaction logs relating to transactions of the file systems in the bucket set 900. Also, file system 910B includes a database 930B that is a mirrored copy of database 930A, both of which includes file system directories of the file systems in the bucket set 900.

For example, within EOS a logical directory does not correspond to a directory in the underlying file system. Instead there is a single table bucket database, and 32 table object database, in one embodiment. This allows objects in a logical directory to span multiple physical file systems (an EOS object can be stored on any physical file system in a storage pool). All objects within a single directory are stored in the same object database table. Databases are stored on two file systems within a pool of file systems, or a bucket set of file systems. In that manner, the loss of a single file system temporarily denies access to the underlying objects, but not to the name space itself.

Within an EOS configuration, the statement "/rest/my-tenant/mybset/d1" is an example of a directory within the EOS name space. The directory may be included in the databases 930A and 930B. As described above, this directory actually exists on two physical file systems, with fail-over to a third, within a single appliance.

As shown in FIG. 9, when a file system containing metadata fails, the remaining copy of the metadata is migrated over to a third file system. For instance, when file system 910A fails, the copy (mirror-2) in file system 910B is migrated to another copy (mirro-3) in file system 910C. Specifically, the database 920B including transaction logs and the database 930B including file system directories are migrated to file system 910C. In that manner, two mirrored copies of the metadata exist.

Figure 10:
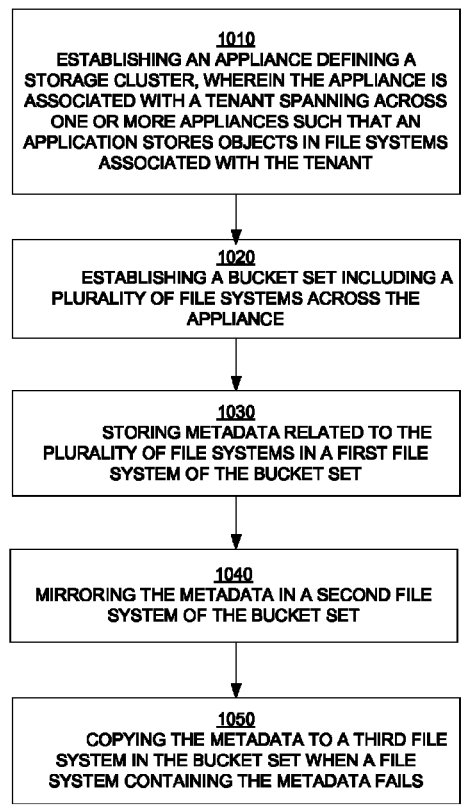
FIG. 10 is a flow chart illustrating a computer-implemented process for migrating copies of transaction logs and file system directories of a bucket set upon failure of a file system containing those logs and directories, in accordance with one embodiment of the present disclosure.

FIG. 10 is a flow chart 1000 illustrating a computer-implemented process for migrating copies of transaction logs and file system directories of a bucket set upon failure of a file system containing those logs and directories, in accordance with one embodiment of the present disclosure. In particular, within an EOS configuration meta data related to file systems within a bucket set are separately stored, mirrored, and backed-up in case of file system failure. As such, EOS file systems support a self healing process for configuration management at an appliance and bucket set level.

Specifically, file system meta data of a bucket set is stored on two file systems within the bucket set, and will migrate to a third in the event of media failure. If a directory or transaction log within a single physical file system fails, one soft sector error can make an entire file system essentially not accessible. EOS bucket sets (tenant name space on a single appliance) contains directory databases, and a transaction log. A bucket set is a pool of file systems, and two are selected to contain metadata. In the event of meta data loss, the surviving copy automatically propagates itself to a third file system.

At block 1010, an appliance is established, wherein the appliance defines a cluster of storage systems. Consistent with EOS configurations of file systems, the appliance is associated with a tenant that spans across one or more appliances, such that an application stores objects in file systems associated with the tenant. In that manner objects stored under the appliance are stored in association with the application.

At 1020, a bucket set is established within the appliance. The appliance may include one or more bucket sets. The established bucket set includes a plurality of file systems available within the appliance. Each file system may span across one or more physical storage systems in the appliance.

At block 1030, metadata related to the plurality of file systems is stored in a first file system of the bucket set. That is, the metadata is independently stored within the bucket set, such that quite possible metadata associated with one file system is stored in another file system. The metadata includes transaction log information related to transactions conducted in association with file systems in the bucket set. The metadata also includes directory information (e.g., name spaces) related to file systems in the bucket set.

At block 1040, the metadata is mirrored in a second a second file system of the bucket set. That is, the metadata is stored in two separate file systems of the bucket sets, as mirrored copies. As such, the metadata is stored in a first file system and a second file system. The metadata is stored in parallel in the two file systems.

At block 1050, the metadata is copied to a third file system in the bucket set when a file system containing the metadata fails. The As an example, when the first file system fails, the metadata stored in the second file system is copied to the third file system within the bucket set. For example, when the first file system fails, the metadata in the second file system is copied to the third file system. Conversely, when the second file system fails, the metadata in the first file system is copied to the third file system. In that manner, in the event of metadata loss, the surviving copy automatically propagates itself to a third file system, in one embodiment.

Coherent Remote Caching without Lock Manager

In a distributed web server environment, it is possible to have the local web cache maintain cache coherency, i.e. rapidly detect changes to the underlying object and invalidate the local copy. This is normally achieved by the local server sending a Head request to the remote server, to obtain the latest modification time. Such a mechanism generates a large amount of WAN traffic, and thus is often disabled, in favor of a periodic incremental update of changed.

In particular, applications such as web sites are routinely replicated to multiple data centers. Detection of changes to the original objects at a local level in a timely fashion and without requiring any WAN traffic is normally not possible. Embodiments of the present disclosure provide for coherency between a locally cached copy and the original object using a global index (Gindex) Specifically, the EOS mechanism consists of widely replicated meta data (by using Gindex) indexing with aliasing. Local copies of remote objects can be created to minimize WAN traffic, and updates to the original can be efficiently detected without requiring any current access traffic to be sent across the WAN. Specifically, the EOS file system can readily solve this problem by using access by object ID and a replicated Gindex. The Gindex is replicated widely. Objects are only replicated for disaster recovery purposes, thus WAN traffic is only generated when an object is updated. The local application uses a cache copy, and a local only Gindex, to maintain consistency by comparing the modification time of the local Gindex and global Gindex, with no WAN traffic whatsoever, in one embodiment.

Figure 11:
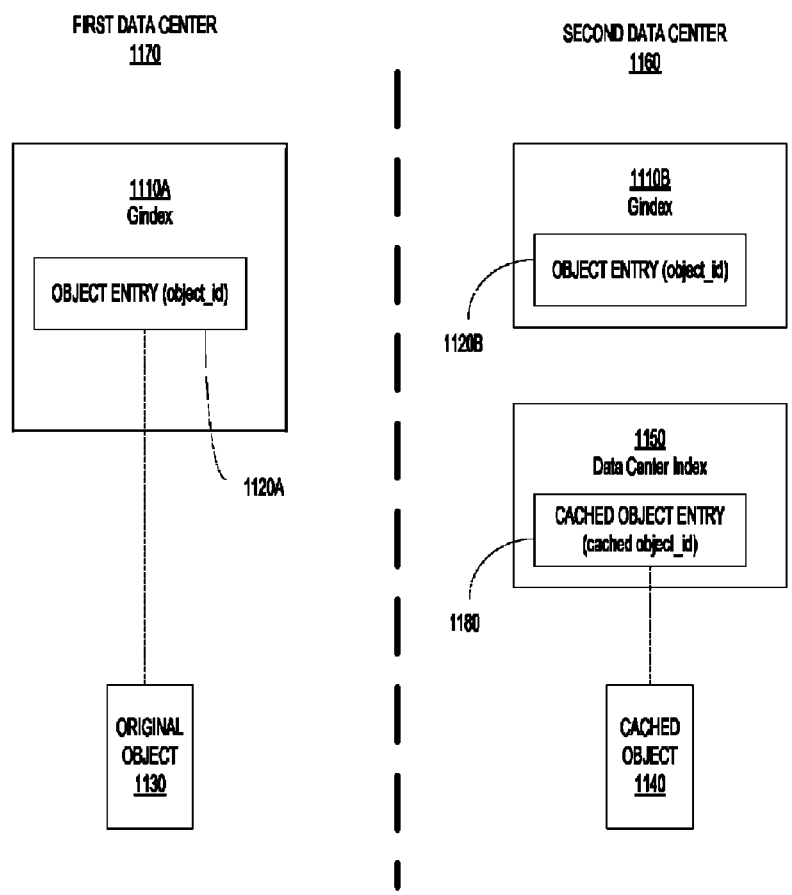
FIG. 11 is a diagram illustrating the distribution of a global index (Gindex) at multiple locations (e.g., data centers, nodes, LANs) of a network supporting an EOS configured file system, in accordance with one embodiment of the present disclosure.

FIG. 11 is a diagram illustrating the distribution of a global index (Gindex) at multiple locations (e.g., data centers, nodes, LANs) of a network supporting an EOS configured file system, in accordance with one embodiment of the present disclosure. As shown, an EOS file system may span across multiple data centers. A first data center 1170 and a second data center are shown, but more data centers may be supported. The first data center is used to store an original object 1130. Consistent with the EOS configured file system, objects stored in file systems associated with the first data center are associated with an application as configured under a tenant, appliance, bucket set relationship, as previously described.

Additionally, one or more cached objects are stored in remote data centers that are copies of the original object 1130. For instance, cached copy 1140 of the object is stored in the second data center. In that manner, requests for the object from a user accessing the second data center for object retrieval in association with the application need not generate WAN traffic to access the original object. Instead, the cached object 1140 is retrieved.

In addition to storing directories and files, the EOS configuration supports a global indexing service called Gindex. Specifically, EOS supports object meta data indexing. Thus, locating objects via a search API instead of by path name is possible within the EOS configured file system, in embodiments. Also, the Gindex is replicated across nodes of the EOS file system, such as, at the tenant level, at the appliance level, bucket set level, and server node level. For instance, the Gindex is replicated at each data center supporting the EOS file system, and may be more widely distributed, such as, at LANs used to access the data centers, or individual nodes of an tenant or appliance. As shown in FIG. 11, a Gindex 1110A is located in the first data center 1170, and a replicated Gindex 1110B is located in the second data center 1160.

As shown in FIG. 11, the Gindex includes entries for each object stored within an application name space. For example, for original object 1130, the object entry 1120A is included. The entry is accessed through the object identifier that is unique to the Gindex. As an example, the statement "x-eos-gindex: ObjectID" defines an object identifier for a newly created object. If a Gindex key is specified when creating a new object, an index entry will be created in the tenant specified by the Gindex, and in the bucket set definition.

Because the Gindex is replicated, the same entry is replicated in the Gindex 1110B located in the second data center. That is, object entry 1120B of Gindex 1110B is a copy of the object entry 1120A of Gindex 1110A. As such, metadata for the object 1130 is propagated throughout the Gindexes used throughout the EOS network. For instance, the last modification time indicator associated with the original object 1130 is originally updated within object entry 1120A of the Gindex 1110A of the first data center, but is then replicated to all other Gindexes, including Gindex 1110B of the second data center. Updates are triggered by transaction, in one embodiment. That is, whenever a transaction occurs on the original object 1130, or any permissioned copy of the original object 1130 suitable for manipulation, then metadata for that transaction is transmitted to all Gindexes.

No matter which Gindex is used, an object can be accessed using any Gindex throughout an EOS file system. For instance, using metadata in the Gindex, a request for an object may be structured as follows: "Get /rest/gindex5?search" and "x-eos-gindex: ObjectID". This operation will return the path to any object which contain the specified Gindex key, or object identifier. More specifically, the request will return a pathname to all copies with current modification times, and information related to both original and local copies are returned.

EOS supports a global indexing capability. It can be used in one of four ways. First, the Gindex may be used as an object meta data index. A Gindex tenant can be associated with a bucket set, in which case any objects which contain x-eos-gindex: objectID will be indexed. Any number of bucket sets, in any number of tenants, can share a common Gindex, which could either be part of a local cloud segment, or remote (in another data center). Second, the Gindex may be used as a client credential manager (e.g., for storing credential information). Third the Gindex may be used as a mapping mechanism, where remote resources are mapped via Gindex maps. Fourth, the Gindex may be used as a key/value pair store.

Gindex is a hashed database that can span multiple appliances. A Gindex tenant is configured exactly the same as an object storage tenant, with pools and bucket sets. Each bucket set contains 32 database tables, each managing between 1 and 128 hash keys (e.g., up to 4096). In one implementation, a Gindex tenant could contain 128 bucket sets, on 128 distinct appliances. Thus, a single 100 billion object index is possible. It is possible to add bucket sets to an existing Gindex, and tables automatically migrate to the new member.

In one implementation, a 128 bucket set Gindex provides 4096 independent tables, and thus should be able to deal with a very large sustained select/insert rate (e.g., hundreds of thousands per second), and be sufficient to handle thousands of concurrent users.

Figure 12:
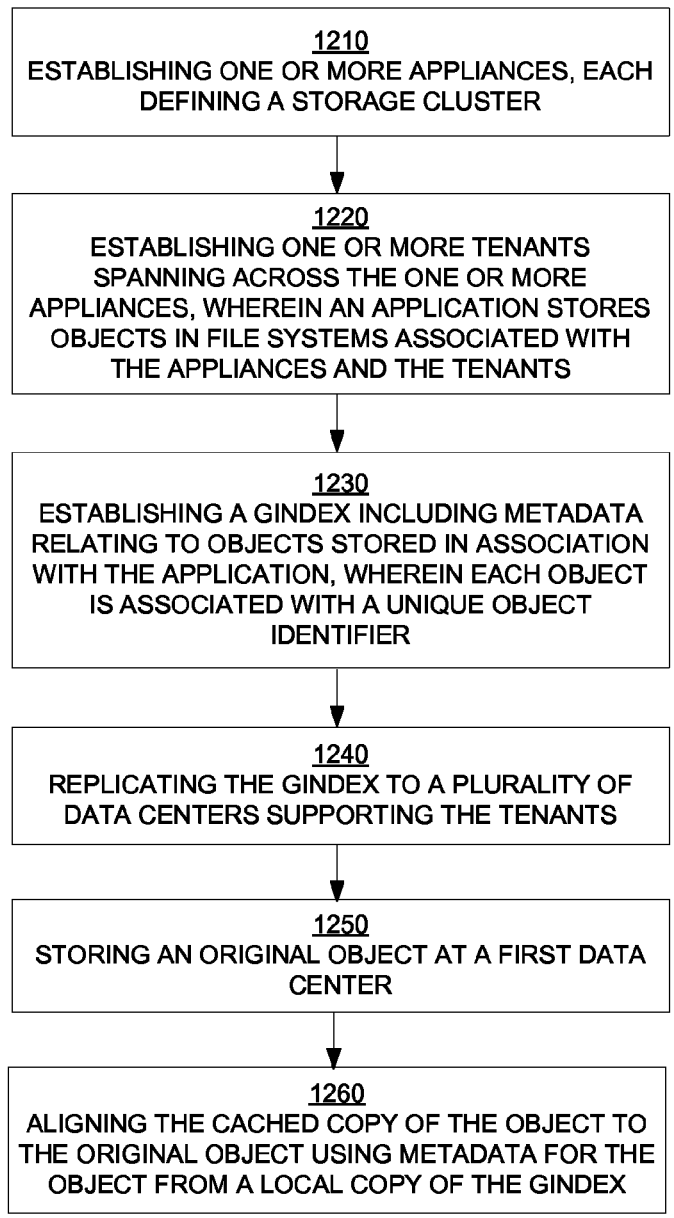
FIG. 12 is a flow chart illustrating a computer-implemented process for maintaining cache coherency of copies of objects through an EOS configured file system, in accordance with one embodiment of the present disclosure.

FIG. 12 is a flow chart 1200 illustrating a computer-implemented process for maintaining cache coherency of copies of objects through an EOS configured file system, in accordance with one embodiment of the present disclosure. Maintaining coherency is more efficient than previous methodologies. Essentially, the modification time of an object is within each related index, which both indicates if there is a local cache copy, and if the cache is up to date.

In blocks 1210 and 1220, an EOS file system is established. Specifically, at block 1210, one or more appliances are established. Each of the appliances define a storage cluster for storing objects. In addition, at block 1220, one or more tenants are established, wherein each tenant may span across one or more of the appliances. A tenant is defined by workload, and may be associated with an application, wherein one or more tenants may be associated with the application. The application stores objects in underlying file systems that are associated with the appliances and the tenants. In particular, a bucket set defines one or more file systems that are available to a tenant configuration within a particular appliance. Further, each appliance may be associated with one or more bucket sets for a particular tenant.

At 1230, a Gindex is established, wherein the Gindex includes metadata relating to objects stored in association with the application. Each object is associated with a unique object identifier, and as such, by using the object identifier, metadata for the object in the Gindex may be accessed, including information leading to the accessing of the original object, or a copy of the object.

At 1240, the Gindex is replicated to a plurality of data centers. The Gindex is small in comparison to storing object data, and can be efficiently replicated throughout an EOS file system. These data centers host the tenants associated with the application. For example, a first data center may host and store the original object at block 1250, and a remote data center contains the Gindex, which can be used to access the original object from the first data center, and/or access a locally cached copy of the object, if it were previously accessed. Any number of indexes may be supported. Thus, in one implementation coherent local caching uses a Gindex for information related to original objects, and a per data center index for information related to cached copies of objects.

At 1260, the cached copy of the object is aligned to the original object using metadata for the object from a local copy of the Gindex. In that manner, WAN traffic is not generated when performing cache coherency, and more specifically, when determining if the cached copy is up-to-date. In one embodiment, the alignment occurs whenever the object is requested, and a cached object exists.

More specifically, a last modification time indicator associated with the cached copy is accessed. In addition, a last modification time indicator associated with the original object is accessed from a local copy of the Gindex on the second data center. In this example, the client is accessing the second data center to manipulate objects in the EOS file system for an application. If the last modification times align, then the cached copy is up-to-date. However, if the last modification times do not align, then the original object has been updated, and the cached object is stale or out-of-date. In that case, a WAN request for the original object is made, and once received, the up-to-date original object is stored as the cached copy in the second data center.

In another embodiment, metadata in the data center index is accessed to align the objects. That is, a data center index is established for the second data center and includes information relating to cached copies of objects stored at the second data center. For instance, the last modification time indicator of each of the cached objects is stored as metadata, and path information leading to the object is provided. By accessing the local copy of the Gindex, information may be retrieved relating to the object. For instance, the metadata will indicate that a cached object exists in the second data center, and provides information leading to the entry in the data center index for the cached object. In addition, the Gindex will provide the last modification time for the original object. As such, both last modification times may be compared for alignment, as previously described.

Push Fail-Over Mode

Appliance fail over is initiated by redirecting to an alternate server. In today's demanding environment, service level agreements (SLAs) indicate that clients want their data NOW. If part of an EOS configured file system fails (e.g., a complete appliance fails, or media on an appliance fails), the client is unwilling to wait minutes for a Disaster Recovery (DR) fail over to a secondary appliance. As such, in embodiments of the present disclosure, when faced with either complete appliance failure, or partial (media) failure, requests are pushed and rerouted to an alternate servicing hub. Thus, a client-side retry based on a service outage indicator initiates (pushes) failover, as opposed to have an external monitor initiate a failover based upon heart beat timeouts in typical systems.

Figure 13:
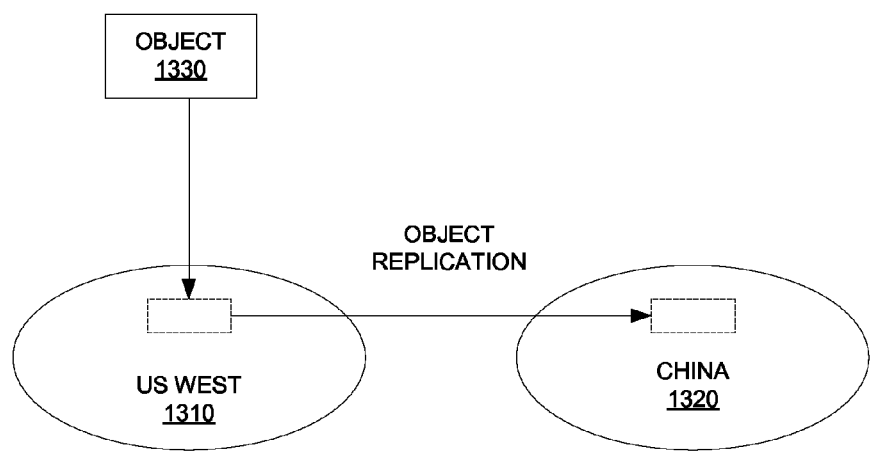
FIG. 13 is a diagram illustrating the replication of objects in an EOS file system name space at two hubs or data centers, in accordance with one embodiment of the present disclosure.

FIG. 13 is a diagram illustrating the replication of objects in an EOS file system name space at two hubs (e.g., data centers), in accordance with one embodiment of the present disclosure. EOS configured file systems are able to provide backup and restoration capabilities. At one level the EOS file system is an application which uses physical file systems. By backing up the underlying file systems, this provides backup to the EOS configured file system. The EOS file system is also capable of providing restoration, by integrating DR replication and backup processes. This is accomplished at least by using one multi-version replica for each bucket set.

As shown in FIG. 13, two hubs support an EOS configured file system. For instance, primary hub 1310 (e.g., US West data center) and secondary hub 1320 (e.g., China data center) store objects for an application utilizing the EOS configured file system. For purposes of clarity, while an EOS tenant may span multiple physical file systems, likely spans appliances, and possibly span data centers, the current EOS configured file system of FIG. 13 is encapsulated in storage systems related to one hub or data center, and replicated, wholly or in part, in a second hub or data center. For instance, an object stored in relation to an application is stored in the EOS configured file system locally at US West hub 1310, the primary hub. Thereafter, the object is replicated at the secondary China hub 1320.

More specifically, the EOS file system (objects, and directories, and name spaces, etc.) may be replicated in China hub 1320. In that manner, a "Get" request can usually be sent to any replica (e.g., China hub 1320). However, if absolutely the latest copy only is required, one way to guarantee this is by routing all "Get" requests to the primary hub 1310.

Further, a "Put" request can be sent to any node that has a replica of the bucket set. Each replica can create files on other replicas. Thus, new object data and meta data delivered in the "Put" request is symmetric, and does not require synchronizing transactions. Furthermore, when the object is installed into the name space a transaction is generated, and the name space update transaction flows from the primary hub or node to the various replicas.

Figure 14:
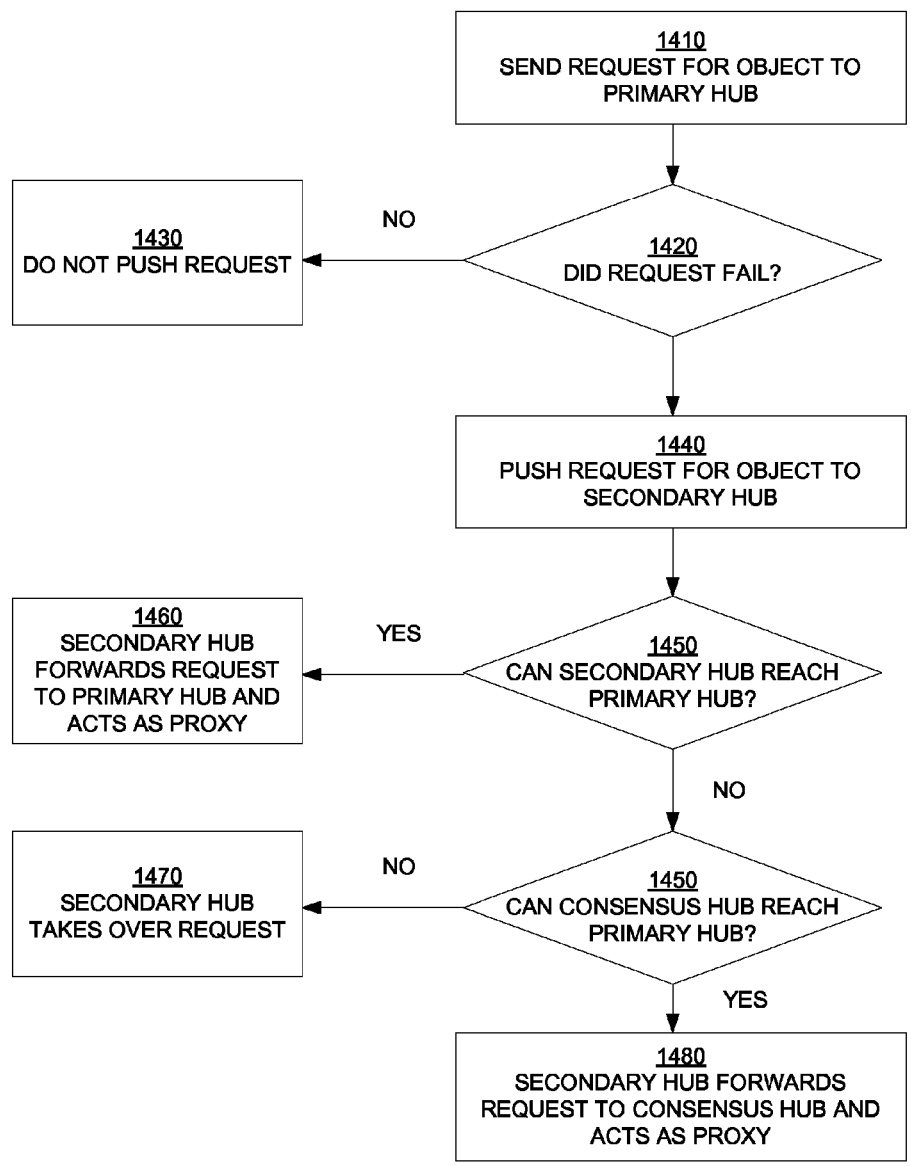
FIG. 14 is a flow chart illustrating a computer-implemented process for providing push failover when processing object requests in an EOS configured file system, in accordance with one embodiment of the present disclosure.

FIG. 14 is a flow chart illustrating a computer-implemented process for providing push failover when processing object requests in an EOS configured file system, in accordance with one embodiment of the present disclosure. Most DR models are active/passive. On the other hand, the EOS configured file system is active/active, meaning that "Get" requests can be satisfied from DR copies, and as implemented in a push fail-over process in embodiments of the present disclosure. Either complete appliance failure, or partial (media) failure requests can reroute the delivery of the request to an alternate server, thus a client side retry from a service outage initiates (pushes) failover, as opposed to have an external monitor based upon heart beat timeouts. Moreover, EOS replication is be synchronous, such that no data loss occurs during a fail-over.

At block 1410, a request for an object is sent from a client device to a primary hub that is supporting a file system. The file system comprises an application wide object name space used for accessing objects of an application stored in physical file systems across one or more appliances (each defining a storage cluster), in association with a tenant logically spanning across the appliances.

At decision block 1420, it is determined whether the request failed. If it has been determined that the request did not fail, then the process continues to block 1430, where the request is not pushed because no failover has occurred. On the other hand, if it has been determined that the request did fail, then the process continues to block 1440, where a secondary hub supporting the application wide object name space is determined, and the request is pushed to the secondary hub. That is, appliance fail over is initiated by redirecting to an alternate server, the secondary server. In one embodiment, delivery of the request to the primary hub is retried one or more times before redirecting the request to the secondary hub. For instance, the client device may have installed information related to the two hubs. In particular, an IP address of the primary hub is stored and marked as the primary address for accessing the EOS configured file system. Also, an IP address of the secondary hub is stored and marked as the secondary address for accessing the EOS configured file system.

At decision block 1450, upon receipt of the request at the secondary hub, it is determined whether the secondary hub may communicate with the primary hub. If the secondary hub determines that communications can be established with the primary hub, then the request is forwarded to the primary hub from the secondary hub for processing. In one embodiment, the secondary hub acts as the proxy to the primary hub, in that any response from the primary hub is routed through the secondary hub and returned to the client device. In another embodiment, the response from the primary hub is directly sent to the client device.

Conversely, if the secondary hub determines that communications cannot be established with the primary hub, then the secondary hub communicates with a majority consensus hub to determine whether that consensus hub may communicate with the primary hub, in decision block 1450. If the majority consensus hub cannot communicate with the primary hub, then the secondary hub then processes the request at block 1470. That is, the secondary hub takes over the role as the primary hub, and all further requests are delivered to the secondary hub first, at least until the primary hub is back online and resumes its role as primary hub to the client device. The client device may periodically check with the primary hub to determine the status of the primary hub. A replicate of the object is stored in association with the secondary hub. On the other hand, at block 1450, the secondary hub may determine that communications can be established between the primary hub and the majority consensus hub, in which case, the request is forwarded to the majority consensus hub from the secondary hub at block 1480. The request is then forwarded to the primary hub by the majority consensus hub. In one embodiment, the secondary hub acts as the proxy to the primary hub, and the majority consensus hub acts as the proxy to the secondary hub, such that any response from the primary hub is routed through the majority consensus hub to the secondary hub and then returned to the client device. In another embodiment, the response from the primary hub is directly sent to the client device.

In an example of appliance failover, a bucket set configuration of an appliance includes a DR pair and a majority consensus node, as defined by the following: "M1:mv1-0"; "M2:cdc1-0"; and "M3:pek1-0". As such, the push failover process is performed as follows. "Put" requests are send to the M1 node. If it fails, this indicates a service outage. Retry the request on the M2 node, and the M2 node checks status of M1 node, using M3 as an alternate intermediary in the case of being not able to connect, and if M1 is disabled or not responding, M2 takes over as M1, and performs the client request.

Coherent Tenant Rollback

An arbitrarily large file system name space in an EOS configured file system, spanning multiple appliances and associated with a tenant, can be rolled back as a unit, in accordance with one embodiment of the present disclosure. The attraction is that it allows a recent changes that are for some reason corrupt to be taken out of the name space, but still accessible. It would be useful when a software upgrade has a bug in it, and also must be rolled back.

As a working example, a large email application services a corporation. The application stores mail objects within an EOS configured file system, such as, on a tenant that is configured solely for this corporation. An upgrade to the application was installed, but proved to be corrupt, in that any emails that were delivered, and stored in the application file system after the upgrade was installed, and opened in an email reader crashed the reader. For instance, the corruption altered the header of incoming emails in a way that crashed the client's instantiation of the email application. The common approach is to restore the objects through a back-up process. However, this takes time and prevents access to the database while undergoing the restoration process. As provided by embodiments of the present disclosure, rolling back access to objects through the application to a time before the upgrade was installed would give information technologists at the corporation time to fix the corrupted upgrade.

Figure 15:
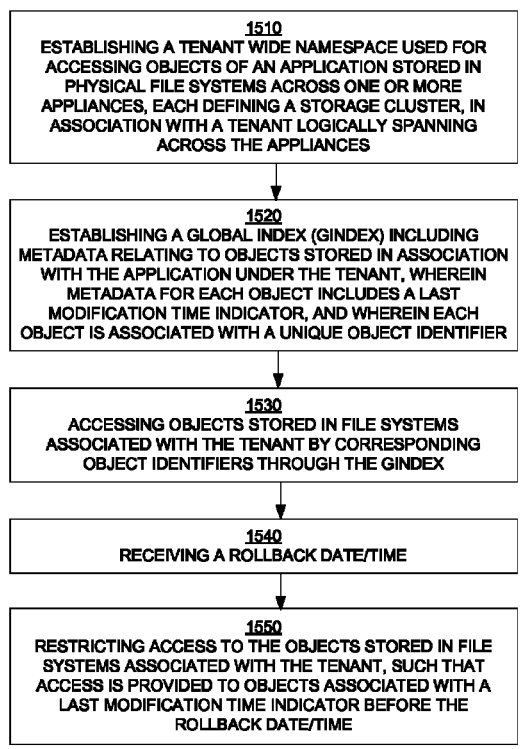
FIG. 15 is a flow chart illustrating a computer-implemented process for providing rollback of an EOS configured file system at a tenant level, wherein the tenant is associated with an application, in accordance with one embodiment of the present disclosure.

FIG. 15 is a flow chart 500 illustrating a method for accessing a file system, and more particularly, a method for rolling back a file system to an older state, in accordance with one embodiment of the present disclosure. For example, the method may be implemented in a non-transitory computer-readable storage medium having computer executable instructions for causing a computer system to perform the method outlined in flow chart 1500. In particular, the EOS configured file system is able to rollback an entire tenant name space of a particular application to a given date and time (date/time). As such, the entire workload (tenant) name space, spanning multiple storage appliances, is capable of being be rolled back to a given data/time, such as, in the event of widespread content corruption.

At block 1510, a tenant wide name space is established. The name space is used for accessing objects of an application stored in physical file systems across one or more appliances, each defining a storage cluster, all in association with a tenant logically spanning across the appliances.

At block 1520, a Gindex is established. The Gindex was previously described in relation to FIGS. 11 and 12. In particular, the Gindex includes metadata relating to objects stored in association with the application under the tenant, wherein each stored object is associated with a unique object identifier.

In addition, metadata for each stored object includes a last modification time indicator. For instance, for a newly created object, the last modification time indicator is associated with the time and date when the object was stored into the EOS configured file system. For an existing object, the last modification time indicator is associated with the time and date when a change or modification to the object was recognized by the EOS configured file system, such as, when the modified object was last stored.

In embodiments, for existing objects, various versions may be stored in the EOS configured file system for DR purposes. For instance, when an existing object is modified, a new version of the object is stored, and an old version of the object is maintained. Each of the new and old versions of the object is associated with a last modification time indicator.

At block 1530, objects stored in file systems associated with the tenant are accessed by corresponding object identifiers through the Gindex. That is, an object is accessed by asserting a search API that discovers metadata in the corresponding entry for the object in the Gindex. For instance, the search API discovers metadata in the Gindex and will return a path for the original object, and any replicates of the object.

At block 1540 a rollback date/time is received. The date/time indicates to which state the file systems should revert back, wherein the file systems are associated with the tenant. More particularly, the file systems are associated with bucket sets of the tenant, and file systems are indexed by bucket sets for the tenant.

At block 1550 access to objects stored in file systems associated with tenant is restricted based on the rollback date/time. In particular, access is provided to objects associated with a last modification time indicator that is older than the rollback date/time. That is, regular users are able to access objects that were created or modified before the rollback date/time. Access is denied to objects that were created or modified after the rollback date/time. For instance, the search API by object id is used to locate objects.

Also, permissioned access is provided to objects associated with a last modification time indicator that is newer than the rollback date/time. The rolled back data should still be present in the name space, and is not lost, but not visible via the standard access API. However, the rolled back data should be available to those with proper credentials using alternative Search operations. In that manner, objects that have been corrupted may be accessed and fixed for later retrieval by the regular user.

Workload Name Space with Hierarchical SLA

An application may need to provide some level of service guarantee to clients. Performance of an EOS workload can be managed via a calibrated hierarchical SLA as opposed to absolute performance statistics. By hierarchical SLA, we mean that there is a summary workload statistic, and underneath are related subcomponent statistics. An application should be able to determine SLA conformance at any time, and if there are problems, to examine various name space components to determine root cause. It is possible to define and monitor SLA conformance, and an application can also dynamically monitor its own SLA conformance, and make "Get" and "Put" scheduling decisions to alter its performance characteristics over time.

Figure 16:
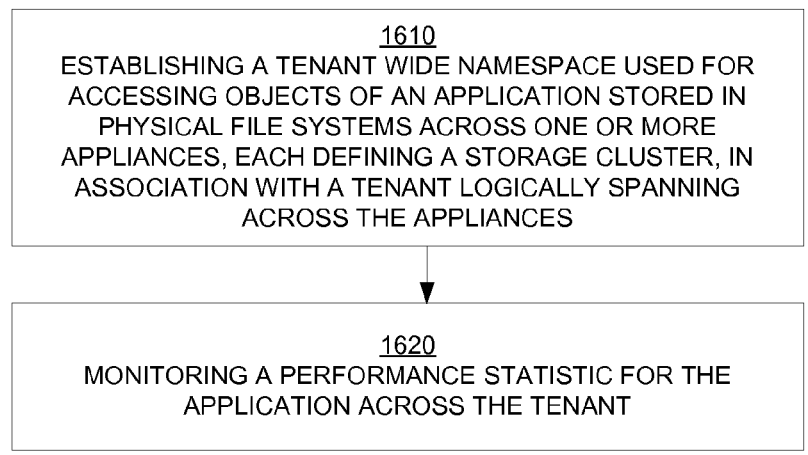
FIG. 16 is a flow chart illustrating a computer-implemented method for monitoring performance across a tenant wide name space, in accordance with one embodiment of the present disclosure.

FIG. 16 is a flow chart 1600 illustrating a computer-implemented method for monitoring performance across a tenant wide name space, in accordance with one embodiment of the present disclosure. For example, the method may be implemented in a non-transitory computer-readable storage medium having computer executable instructions for causing a computer system to perform the method outlined in flow chart 1600. In particular, the EOS configured file system is able to monitor performance statistics across a tenant, across an appliance of the tenant, and across a bucket set of the appliance.

In particular, at block 1610, a tenant wide name space is established. The name space is used for accessing objects of an application stored in physical file systems across one or more appliances, each defining a storage cluster, all in association with a tenant logically spanning across the appliances. The tenant is associated with a file system that includes an application wide name space instantiated in a global index (Gindex) that is used for accessing objects related to an application. The tenant wide name space is a subset of the application wide name space.

At 1620, a performance statistic is monitored for the application across the tenant. More particularly, summary workload statistics are monitored and calculated via a calibrated hierarchical service level agreement (SLA). In the EOS configured file system, a multiple tenant model means that a number of applications can securely and independently access common storage. To provide consistent service quality for all clients, SLAs may be established and monitored for each application. This allows for consistent performance across a multiple tenant model.

The EOS configured file system includes a monitoring tool to monitor and display summary workload statistics. The monitoring tool is a feature of the performance monitor 650 of the system 600 shown in FIG. 6. In particular, FIG. 17A is a diagram illustrating a display of a graphical user interface (GUI) 1700A showing performance statistics across a tenant wide name space for an application, in accordance with one embodiment of the present disclosure.

In one implementation, the color coded single console of the GUI 1700A provides monitoring of file system performance for management purposes. Importantly, performance of an EOS workload can be managed via a calibrated hierarchical SLA as opposed to absolute performance statistics. That is, instead of monitoring performance at the physical storage level, performance is measured at the tenant, appliance, or bucket set levels.

Figure 17A:
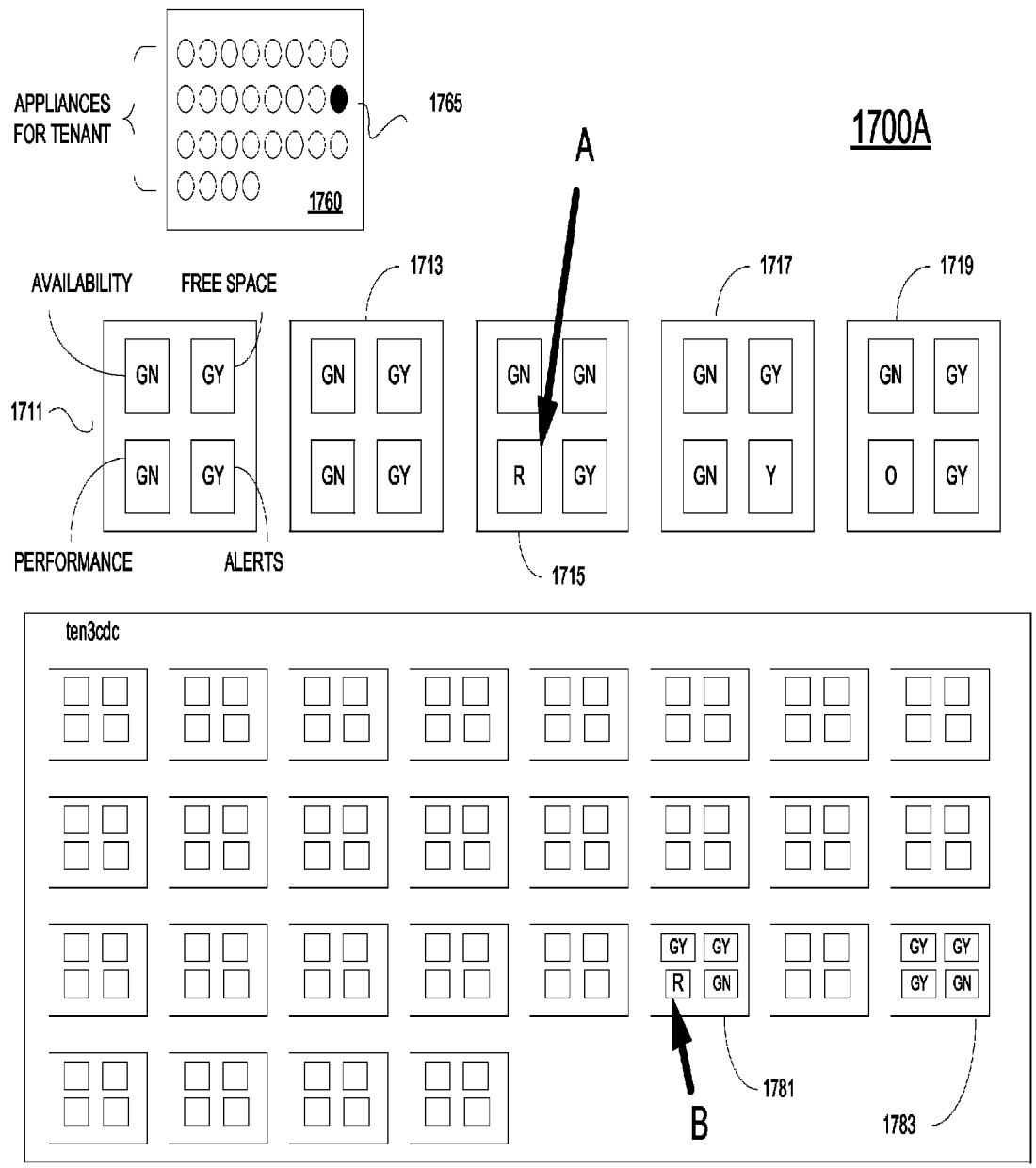
FIG. 17A is a diagram illustrating a display of a graphical user interface showing performance statistics across a tenant wide name space for an application, in accordance with one embodiment of the present disclosure.

As shown in FIG. 17A, an application is associated with multiple tenants 1711, 1713, 1715, 1717, and 1719. With regards to hierarchical SLA, there is a summary workload statistic, and underneath that summary are related subcomponent statistics. The "eosmon" display shown in FIG. 17A presents SLA conformance as a colored icon (e.g., red, yellow, green, gray) giving the administrator an at a glance summary of a large number of workloads (tenants) on a single monitor. These colors are intended to give a quick summary of performance for various categories. For instance, at the tenant level, a quick summary of statists is provided for various categories in FIG. 17A. In that manner, an administrator can identify when a particular tenant is suffering from performance problems. The categories include availability, free space, performance, and alerts. Each of the categories are pointed out in relation to tenant 1711. The positioning of the summary boxes for each of these categories is consistent for each of the other tenants 1713, 1715, 1717, and 1719.

The monitor consolidates statistics across all storage appliances which service the tenant. In other embodiments, information may be displayed using alternate means, such as, through other color variations, descriptive text, icons, audio, and other forms of conveying information.

The Eos Monitor (eosmon) shown in FIG. 17A allows the administrator to calibrate current performance of a workload, and define load and saturation thresholds. Subsequent to calibration, performance management is based on SLA conformance decay over time. The eosmon display presents SLA conformance as a colored icon (red, yellow, green, gray) giving the administrator an at a glance summary of a large number of workloads (tenants) on a single monitor. This monitor consolidates statistics across all storage appliances which service the tenant. When there is a problem, the icon will show yellow or red. As shown in FIG. 17A, tenant 1715 has a performance problem, as consolidated across its appliances, and as indicated by the RED color in the corresponding box for performance, as shown by arrow A.

The icon supports drill down navigation. By selecting tenant 1715, appliances for that tenant are shown in block 1760. In particular, for tenant 1715, there are twenty-eight appliances. Block 1760 indicates which appliance is currently being monitored, which is appliance 1765.

Additionally, drill down performance statistics for each of the appliances in tenant 1715 is shown in block 1780. That is, a summary of performance statistics for each category (availability, free space, performance, and alerts) are given for each of the 28 appliances in block 1780. As shown, only two appliances have data stored in association with the application, appliance 1781 and 1783. As shown in FIG. 17A, appliance 1781 is suffering from performance problems, as shown by the red indicator of the box associated with the performance category, that is highlighted by arrow B.

Thus, a performance problem somewhere in a multiple appliance cloud segment (say 28 appliances), with possibly 50 workloads, can be effectively monitored on a single console, with root cause of performance problems detectable within seconds.

FIG. 17B illustrates a table 1700B showing performance statistics across a selected appliance 1781 of the tenant 1715, both of which are associated with a tenant wide name space for an application, in accordance with one embodiment of the present disclosure. That is, since appliance 1781 is suffering from performance problems, statistics relevant to performance can be illuminated (such as, by selecting the icon representing appliance 1781 in FIG. 17A). As such, the EOS configured file system provides for drilling down to provide the underlying statistics. These may be made available to the application via the EOS restful API set. Thus, the performance statistics for a name space, are included within the same name space.

The performance statistic is measured by workload, such as, across the tenant, across an appliance of the tenant, or across a bucket set of file systems of an appliance of the tenant. Performance statistics (SLAs) are maintained per tenant, and it is possible to specify a maximum operation count (iops) and an average elapsed time (latency or saturation) thresholds to monitor SLA conformance. For instance, these statistics are available to applications via the /mon API. As such, an application can be to a large extent self load balancing. An SLA threshold, (maximum iops per minute, maximum average latency) can be associated with each tenant, and each bucket set. Per minute performance statistics are available via the /mon API.

In one implementation, the performance statistic monitors a load factor that is defined as the number of maximum operation count (iops) per interval (e.g., minute interval) measured against a calibrated threshold. That is, load is the number of iops per interval measured against a calibrated threshold. Equation 1 illustrates calculation of the load statistic for a workload.

$$\text{LOAD} = \frac{IOPS}{\text{Calibrated } IOPS \text{ at } 100\%} \quad (1)$$

As an example, consider performance measurements measured for an appliance 1781 of a particular tenant 1715 in FIG. 17B. For this appliance 1781, the calculated iops measuring the maximum operation count is 600. The calibrated iops at 100% is 2800. As such, the workload across this appliance is at 21% of the maximum allowed. In this case, the load factor is within SLA compliance.

In addition, in another implementation the performance statistic monitors a saturation that is defined as the average latency per operation as measured against a calibrated threshold. Saturation is the average latency per operations measured against a calibrated threshold. Equation 2 illustrates the calculation of the saturation statistic for a workload.

$$\text{SATURATION} = \frac{\text{Average Latency Per Operation}}{\text{Calibrated Latency at } 100\%} \quad (2)$$

Continuing with the example provided in FIG. 17B, the calculated average latency per operation is 31 ms. The calibrated maximum average latency per operation is 28 ms. As such, the workload across this appliance is at 113% of the maximum allowed, and is over saturated. As such, the saturation factor is not within SLA compliance for this appliance of the tenant.

Within a tenant there are bucket sets which are storage within a single appliance, and their replicas. A hierarchical sub tree of bucket set followed by node within bucket set, or node followed by bucket set within node is available. This provides for performance statistics to be calculated at a tenant level which consolidates appliance performance information, appliance level, and a bucket set level.

In one embodiment, operations performed within the tenant wide name space are rebalanced according to the performance statistics. For instance, a read mixture is adjusted between an appliance and one or more appliance replicas associated with the appliance, and a write mixture is adjusted between bucket sets of a one or more appliances, each of which are associated with the tenant.

Integrated Load Balancing API

In one embodiment, operations performed within the tenant wide name space are rebalanced according to the performance statistics. That is, if an application is in danger of SLA violations, the EOS configured file system is able to migrate the workload to different servers to rectify the situation. For instance, a read mixture is adjusted between an appliance and one or more appliance replicas associated with the appliance, and a write mixture is adjusted between bucket sets of a one or more appliances, each of which are associated with the tenant. As such, in embodiments of the present disclosure, applications are able to monitor their own performance in real time, and self adjust I/O workloads accordingly, within the context of a file system name space.

EOS supports a calibrated SLA model, as previously described in relation to FIGS. 16, 17A and 17B. SLA performance application (tenant) wide is available. The workload can be distributed across multiple appliances (bucket sets). SLA conformance for each bucket set, and each bucket set replica is available. An application can take specific actions to maintain SLA without a service interruption. If an application is in danger of SLA violations, the workload must migrate to different servers to rectify the situation. As such, an application SLA can be maintained. For instance, applications can dynamically favor one replica over another to schedule "Get" requests, and favor one appliance over another as the home for newly created objects. Thus current and historical performance can be integrated into application IO scheduling.

Figure 18:
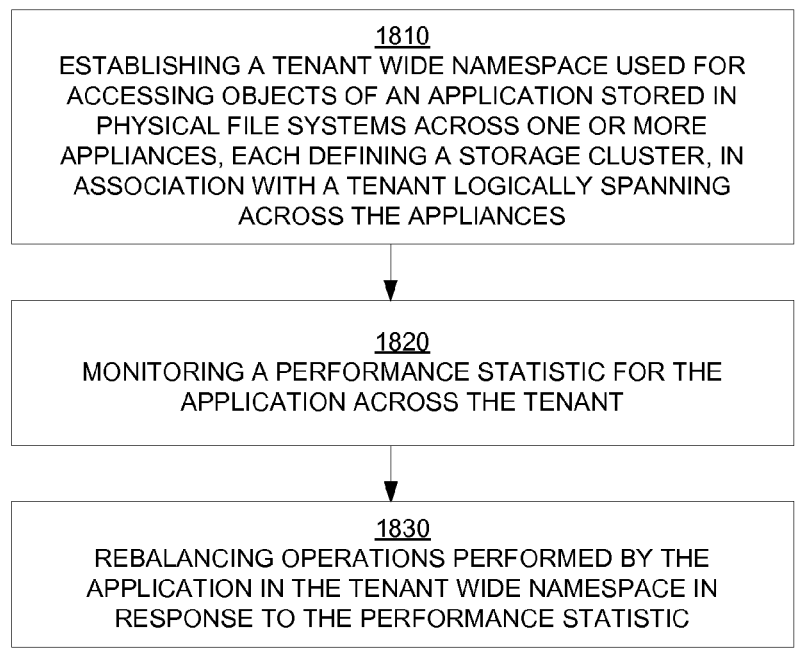
FIG. 18 is a flow chart illustrating a computer-implemented method for monitoring performance across a tenant wide name space and balancing load mixtures in response to the performance, in accordance with one embodiment of the present disclosure.

FIG. 18 is a flow chart illustrating a computer-implemented method for monitoring performance across a tenant wide name space and balancing load mixtures in response to the performance, in accordance with one embodiment of the present disclosure.

At block 1810, a tenant wide name space is established. The name space is used for accessing objects of an application stored in physical file systems across one or more appliances, each defining a storage cluster, all in association with a tenant logically spanning across the appliances. The tenant is associated with a file system that includes an application wide name space instantiated in a global index (Gindex) that is used for accessing objects related to an application. The tenant wide name space is a subset of the application wide name space.

At 1820, a performance statistic is monitored for the application across the tenant. More particularly, summary workload statistics are monitored and calculated via a calibrated hierarchical service level agreement (SLA). In the EOS configured file system, a multiple tenant model means that a number of applications can securely and independently access common storage. To provide consistent service quality for all clients, SLAs may be established and monitored for each application. This allows for consistent performance across a multiple tenant model.

At 1830, operations performed in relation to the application are rebalanced in the tenant wide name space, in response to the performance statistic. In one implementation, a read mixture is adjusted between an appliance and one or more appliance replicas associated with the appliance, and a write mixture is adjusted between bucket sets of a one or more appliances, each of which are associated with the tenant. Specifically, network saturation and actuator saturation are considered. As such, "Get" and "Put" requests can be routed to any replica node, favoring faster performing appliances.

In the case of altering the read mixture, an application can favor one replica over another to schedule "Get" requests for objects. That is, in the EOS configured file system, data on one appliance is replicated to one or more other appliances, for disaster recovery purposes. As such, if one appliance is not performing well under an existing read allocation mixture, the allocation mixture may be adjusted so that reads for objects included in that appliance are delivered to replicas of that appliance. This effectively rebalances the read mixture to favor higher performing tenants, appliances, or bucket sets.

In the case of altering the write mixture, it is well known that newer objects tend to be accessed more frequently than older objects. Because average response time of each bucket set is available, the performance of each bucket set can be compared against the performance of other bucket sets in the corresponding appliance. Thus, new objects in a "Put" request can favor higher performing bucket sets, effectively altering the I/O workload (reads and writes to existing objects) in the future. That is, new objects are stored in one of the higher performing bucket sets. In a real world situation, this form of rectification is effective when the application notices that SLA conformance is declining over time.

In another embodiment, since the /admin API allows bucket sets to be created dynamically, a privileged application could widen its cloud footprint by allocating new objects on a new bucket set. As such, new "Put" requests are routed to any newly created replica node, to favor faster performing appliances. Specifically, a privileged application could also include the concept of reserve storage, to be used in the case where a workload has exceeded current service capacity. In that case, a new file system is created on a new or existing appliance. That file system can be used immediately without requiring operator/administrator intervention. As such, a new bucket set is created from reserve file systems located on a new or existing appliance. New objects are allocated to the newly created bucket set, and more specifically to file systems within the newly created bucket set.

For illustration purposes, here follows a real world model. An anti virus product includes 2 GB of network storage for 20 million users. As such, the users are demanding 40 PB of storage in total. At 100 TB per appliance for instance, that would require 400 appliances to service the users. Each user is assigned a home directory, but how much space they use, and how frequently they access their storage, is up to them.

Assume 5 TB physical file systems, and an estimate of 1 GB usage per user. This leads to 5,000 users being allocated to each physical file system. If the average consumption of these users is 1.1 GB, the file system will run out of space. Also, if these users are overly active, performance becomes unacceptable. Maintaining adequate SLA will require constant migration to re-balance the servers, as is provided in embodiments of the present disclosure. Specifically, the load balancing feature of the EOS configured file system will evenly balance objects across all file systems within a storage pool of an appliance, leading to better load balancing across the underlying physical file systems.

But once an appliance is out of free space, and the appliance itself is either central processing unit (CPU) or storage saturated, performance will decay. A more general solution provided by embodiments of the present disclosure provides for balancing object access across an entire cloud segment, as opposed to constraining the objects for a single client to a single appliance. Given an adequate underlying network fabric, each individual appliance should be able to respond to client requests at network speed.

The load balancing feature of the EOS configured file system achieves this by using bucket only bucket sets, in one embodiment. In this case, the underlying objects are stored in a second tenant (local-objects: false). In addition, the underlying objects are evenly distributed across the alternate tenant, which could consist of up to 128 appliances. In addition, the bucket sets themselves can be stored on SSD for fast read performance.

With this model performance, decays are a function of LAN saturation, not appliance saturation. Also, a directory does not run out of space, until an entire cloud segment is out of space. Since additional appliances can be added to a cloud segment at any time, this can be avoided.

Efficient Mobile Storage

It may be desirable to access objects universally by pathname, as opposed to using an Object ID. In this case, a replicated Gindex is inappropriate. However, a widely replicated bucket on bucket set can be used, making the name space universal, with a combination of local and remote objects. The problem is illustrated when a user frequently travels from one zone to another within an EOS configured file system. In a mobile storage layout of the present invention, no WAN traffic is generated, except for when an object on a remote server is accessed. This is because directories are widely replicated.

In addition, for replicated objects, it is quite possible to select an appropriate bucket set in an attached alternate tenant that is location aware. Consider a user that is normally based in the USA West zone (e.g., Data Center West 310 of FIG. 3), but frequently travels to China. While at home, new objects replicate to a second server within USA West, or possibly USA East (e.g., Data Center East 320 of FIG. 3). However, when in China, newly created objects use a bucket set that replicates from China back to USA West. That is, the new object is local to China while the user is in China, and a replicated copy is waiting in the USA as well. Again, when back in the USA, the user will access objects through USA West.

In particular, objects within a single logical directory can be resident anywhere within a storage cloud. Applications, such as those accessed using smart phones or mobile devices require that the servicing data center migrates along with the user. In embodiments of the present invention, the name space of a file system is replicate to multiple data centers. And as long as there is free storage anywhere within the alternate tenant, there is free storage in all directories that reference the alternate tenant, which could be any number of tenants and bucket sets within them.

Figure 19:
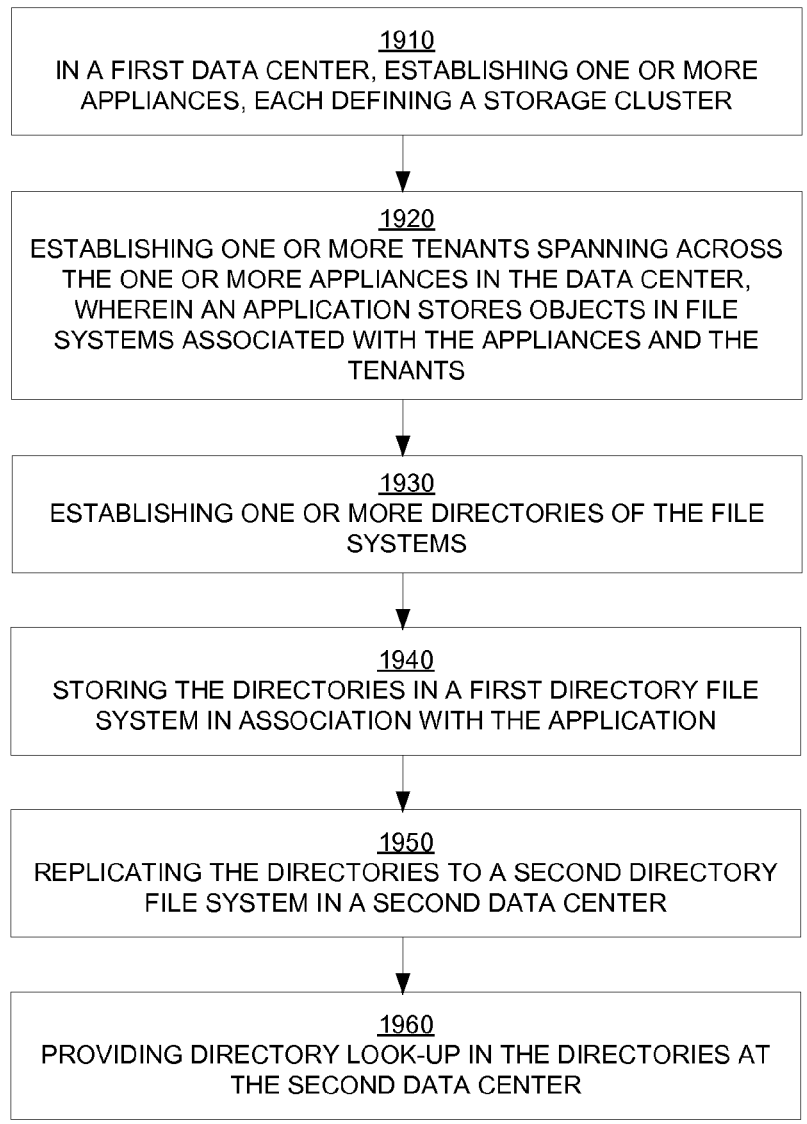
FIG. 19 is a flow chart illustrating a computer-implemented method for replicating file system directories throughout an EOS configured file system, such that local directory look-up operations are possible at a remote data center.

FIG. 19 is a flow chart illustrating a computer-implemented method for replicating file system directories throughout an EOS configured file system, such that local directory look-up operations are possible at a remote data center.

In blocks 1910 and 1920, an EOS configured file system is established. Specifically, at block 1910, one or more appliances are established. Each of the appliances define a storage cluster for storing objects. In addition, at block 1920, one or more tenants are established, wherein each tenant may span across one or more of the appliances. A tenant is defined by workload, and may be associated with an application, wherein one or more tenants may be associated with the application. The application stores objects in underlying file systems that are associated with the appliances and the tenants. In particular, a bucket set defines one or more file systems that are available to a tenant configuration within a particular appliance. Further, each appliance may be associated with one or more bucket sets for a particular tenant.

At block 1930, one or more directories are established for the file systems that are available to a tenant, corresponding appliances, and corresponding bucket sets. These directories provide a list of objects located within the file systems and a pathname to those objects. Also, the directories may include a directory name space. Directory look-up for an object is performed through a file manager application, and uses the underlying path name to access an object. Look-up operations do not use an object identifier, such as, that implemented with the Gindex.

At block 1940, the directories are stored in a first directory file system in association with the application. That is, the directories are separately stored from the objects. As such, a directory for the directories is established, and one or more file systems are dedicated to object storage. In one implementation, the first directory file system is associated with the first data center, and is locally stored in the first directory file system.

In addition, at block 11950, the directories associated with file systems in the tenant of the first data center are replicated to a second data center. Specifically, the directories are replicated to a second directory file system located at the second data center. In that manner, directory look-up for objects in the first data center can be performed at the second data center using the locally stored directories. As such, at block 1960, directory look-up is provided at both directories located at the first and second data centers.

Within a tenant configuration for the first data center, an alternate tenant configuration is defined. For instance, the statement "Alternate: alternate_tenant" defines the alternate tenant located at the second data center. A path name to the alternate tenant may be provided in an object data base entry for the directory, such as, through the following statement: "Islink: true Reference: path in alternate_tenant".

In addition, alternate bucket sets may also be defined. For instance, the statement "Local-objects: false" indicates that objects are located in another tenant, and quite possible another data center. Since the bucket set that contains directories contains no objects, it can be widely replicated. The objects within the directories can be stored in any bucket set within the alternate tenant.

In a multi-geographic situation, name space look-up is always a local operation, resulting in no WAN traffic. For instance, a directory look-up request at a second data center is performed using the local copy of the directories, even if the object is stored at another data center, say the first data center. The object may not be stored locally at the second data center, and the directory entry provides a path name to the object stored in the first data center. In that manner, the object may be retrieved from the first data center and provided in response to the request. Furthermore, the object is replicated at the second data center for local access, and duly indicated in the local directory, as well as replicated directories throughout the EOS configured file system.

In addition, in the multi-geographic situation, a user may wish to write new objects within the directory name space. The object is stored locally in the hub accessed by the user, and its directory information is duly referenced both in the local directory, as well as any replications of that directory. In that manner, the directory name space follows the user no matter which hub or data center is used to access the EOS configured file system.

For example, a new object may be stored at the second data center. While the first data center is the home hub for accessing the EOS configured file system, the user may also access the second data center when traveling. For instance, a user may use USA West data center and a China based data center when in corresponding locations. The new object's directory information is incorporated as a directory entry in the local directory file system. That directory information is replicated throughout the directory name space, such as, to the directory file system located in the first data center. In that manner, directory look-up is provided for the new object in both directory file system located in the first and second data centers. Thus, the user may search for that new object in the directory name space locally at both the first and second data centers, thereby generating no WAN traffic during directory look-up operations.

Thus, according to embodiments of the present disclosure, an application wide name space is established that is used for accessing objects of an application stored in physical file systems across one or more appliances, each defining a storage cluster, and in association with a tenant logically spanning across the appliances. Objects are accessed via the name space via restful APIs. The name space is automatically discovered throughout the EOS configured file system. File system metadata in the EOS configured file system is backed-up on two file systems, and migrates to a third file system in the event of media failure. A Gindex is provided establishing an application wide name space used for accessing objects with object identifiers instead of path name. Appliance fail-over is pushed to an alternate server/hub by the client when experiencing service failures. An entire tenant namespace can be rolled back to a particular date/time through application of the Gindex. Performance statistics are monitored on an application, tenant, appliance, or bucket set levels as opposed to absolute performance statistics. Load balancing is performed in response to the performance statistics. A file system directory of an application in one data center is replicated throughout an EOS configured file system for providing local directory look-up operations at a remote data center.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A method comprising:
    establishing a tenant wide name space to access objects of an application stored in one or more physical file systems across one or more appliances, each appliance defining a storage cluster in association with a tenant logically spanning across the one or more appliances;
    establishing a global index (Gindex) including metadata relating to objects stored in association with the application under the tenant, wherein metadata for each object includes a last modification time indicator, and wherein each object is associated with a unique object identifier;
    accessing objects stored in the one or more physical file systems associated with the tenant by corresponding object identifiers through the Gindex;
    receiving a rollback date/time; and
    restricting access to the objects stored in the one or more physical file systems associated with the tenant, such that access is provided to objects associated with a last modification time indicator that is older than the rollback date/time.

2. The method of claim 1, further comprising providing permissioned access to objects associated with a last modification time indicator newer than the rollback date/time.

3. The method of claim 1, further comprising:
    storing new objects and new versions of existing objects having a last modification time indicator past the rollback date/time in the one or more physical file systems associated with the tenant; and
    providing permissioned access to the new objects or new versions of existing objects.

4. The method of claim 3, further comprising:
    storing a system defined new version of an existing object;
    defining an expiration period for an old version of the existing object, wherein each of the new version and the old version is associated with a last modification time indicator; and
    deleting the old version after the expiration period.

5. The method of claim 1, further comprising restricting access to the objects stored in the one or more physical file systems associated with a bucket set of the tenant.

6. The method of claim 5, wherein the one or more physical file systems are indexed by the bucket set of the tenant.

7. The method of claim 2, wherein accessing objects stored in the one or more physical file systems associated with the tenant comprises asserting a search API that discovers metadata in the Gindex corresponding to an object stored in the one or more physical file systems.

8. The method of claim 7, wherein providing permissioned access comprises asserting an alternative search API and wherein the alternative search API and the search API are not the same API.

9. The method of claim 2, wherein providing permissioned access to objects associated with a last modification time indicator newer than the rollback date/time further comprises accessing and fixing corrupt objects associated with a last modification time indicator newer than the rollback date/time.

10. The method of claim 9, further comprising providing unrestricted access to objects associated with a last modification time indicator newer than the rollback date/time, wherein unrestricted access is limited to objects that have been accessed and fixed.

11. A system for accessing a file system, comprising:
    one or more processors communicatively coupled to a file system, wherein the one or more processors are configured to:
        establish a tenant wide name space used for accessing objects of an application stored in one or more physical file systems across one or more appliances, each appliance defining a storage cluster in association with a tenant logically spanning across the one or more appliances;

establish a global index (Gindex) including metadata relating to objects stored in association with the application under the tenant, wherein metadata for each object includes a last modification time indicator, and wherein each object is associated with a unique object identifier;

access objects stored in the one or more physical file systems associated with the tenant by corresponding object identifiers through the Gindex;

receive a rollback date/time; and restrict access to the objects stored in the one or more physical file systems associated with the tenant, such that access is provided to objects associated with a last modification time indicator that is older than the rollback date/time.

12. The system of claim 11, wherein the one or more processors are further operable to provide permissioned access to objects associated with a last modification time indicator newer than the rollback date/time.

13. The system of claim 11, wherein the one or more processors are further operable to:

store new objects and new versions of existing objects having a last modification time indicator past the rollback date/time in the one or more physical file systems associated with the tenant; and provide permissioned access to the new objects or new versions to existing objects.

14. The system of claim 13, wherein the one or more processors are further operable to:

store a system defined new version of an existing object;

define an expiration period for an old version of the existing object, wherein each of the new version and the old version is associated with a last modification time indicator; and delete the old version after the expiration period.

15. The system of claim 11, wherein the one or more processors are further operable to restrict access to the objects stored in the one or more physical file systems associated with a bucket set of the tenant.

16. A non-transitory computer-readable storage medium comprising:

instructions executable by one or more processors to cause the one or more processors to:

establish a tenant wide name space used for accessing objects of an application stored in one or more physical file systems across one or more appliances, each appliance defining a storage cluster, in association with a tenant logically spanning across said the one or more appliances;

establish a global index (Gindex) including metadata relating to objects stored in association with the application under the tenant, wherein metadata for each object includes a last modification time indicator, and wherein each object is associated with a unique object identifier;

access objects stored in the one or more physical file systems associated with the tenant by corresponding object identifiers through the Gindex;

receive a rollback date/time; and restrict access to the objects stored in the one or more physical file systems associated with the tenant, such that access is provided to objects associated with a last modification time indicator that is older than the rollback date/time.

17. The non-transitory computer-readable storage medium of claim 16, wherein the instructions further cause the one or more processors to provide permissioned access to objects associated with a last modification time indicator newer than the rollback date/time.

18. The non-transitory computer-readable storage medium of claim 16, wherein the instructions further cause the one or more processors to:

store new objects and new versions of existing objects having a last modification time indicator past the rollback date/time in the one or more physical file systems associated with the tenant; and provide permissioned access to the new objects or new versions to existing objects.

19. The non-transitory computer-readable storage medium of claim 18, wherein the instructions further cause the one or more processors to:

store a system defined new version of an existing object;

define an expiration period for an old version of the existing object, wherein each of the new version and the old version is associated with a last modification time indicator; and delete the old version after the expiration period.

20. The non-transitory computer-readable storage medium of claim 16, wherein the instructions further cause the one or more processors to restrict access to the objects stored in the one or more physical file systems associated with a bucket set of the tenant.

* * * * *